United States Patent [19]

Bykov et al.

[11] Patent Number: 4,526,471
[45] Date of Patent: Jul. 2, 1985

[54] METHOD FOR SENSING SPATIAL COORDINATE OF ARTICLE POINT AND APPARATUS THEREFOR

[76] Inventors: Anatoly P. Bykov, ulitsa Stroitelnaya, 6, kv. 16; Anatoly A. Orlov, ulitsa Naberezhnaya Tsiolkovskogo, 22, kv. 82, both of Zhukovsky, Moskovskaya oblast; Dmitry D. Gribanov, ulitsa Chusovskaya, 11, korpus 6, kv. 35, Moscow; Vladimir P. Kulesh, ulitsa Stroitelnaya, 6. kv-29, Zhukovsky, Moskovskaya oblast; Sergei D. Fonov, Balashikhinsky raion, poselok Zarya, 180, kv. 52, Moskovskaya oblast; Vitaly V. Egorov, ulitsa Komsomolskaya, 7, kv. 49; Leonid M. Moskalik, ulitsa Molodezhnaya, 13, kv. 177, both of Zhukovsky, Moskovskaya oblast; Apollinary K. Martynov, 3-ya Frunzenskaya ulitsa, 3, kv. 40, Moscow; Vladimir E. Ryadchikov, ulitsa Gagarina, 28, kv. 59, Zhukovsky, Moskovskaya oblast, all of U.S.S.R.

[21] Appl. No.: 389,470

[22] Filed: Jun. 17, 1982

[51] Int. Cl.$^3$ ............................................. G01B 11/14
[52] U.S. Cl. ...................................... 356/373; 356/375
[58] Field of Search ......................... 356/28, 373, 375; 250/237 G

[56] References Cited

U.S. PATENT DOCUMENTS 3,781,115  12/1973  Rader et al. ........................ 356/375
3,930,734  1/1976   Holly et al. ........................... 356/28
4,078,173  3/1978   Fultz ................................ 250/237 G
4,384,204  5/1983   Tamaki et al. .................... 250/237 G

FOREIGN PATENT DOCUMENTS 2157813  3/1977  Fed. Rep. of Germany .
7938     3/1977  Japan .
1521351  8/1978  United Kingdom .

Primary Examiner—R. A. Rosenberger
Attorney, Agent, or Firm—Fleit, Jacobson, Cohn & Price

[57] ABSTRACT

A method for sensing a spatial coordinate of a point of an article, wherein a main coherent light field is formed in the area of the article and an approximate coordinate of a selected point of the article is found by means of an optical characteristic of this field. Simultaneously, a system of additional coherent light fields is formed in the area of the article, said light fields having periodic spatial and temporal modulation of illumination, and engaged in no interaction with the main coherent light field and between one another. The phase of each additional coherent light field in the selected point of the article is measured. Making use of the already obtained approximate coordinate of the selected point of the object and the measured phases, increasingly accurate coordinates of the selected point of the article are successively found. An apparatus for realizing the proposed method includes transmitting and receiving sections. The transmitting section is intended to form the main coherent light field and a system of additional coherent light fields, and has a main transmitting optical channel and a set of additional transmitting optical channels. The receiving section has a main and additional receiving channels and a coordinate computing unit. The receiving channels measure the optical characteristic and the phase of, respectively, the main and each of the additional coherent light fields, the resulting measurements being fed to the coordinate computing unit.

19 Claims, 25 Drawing Figures

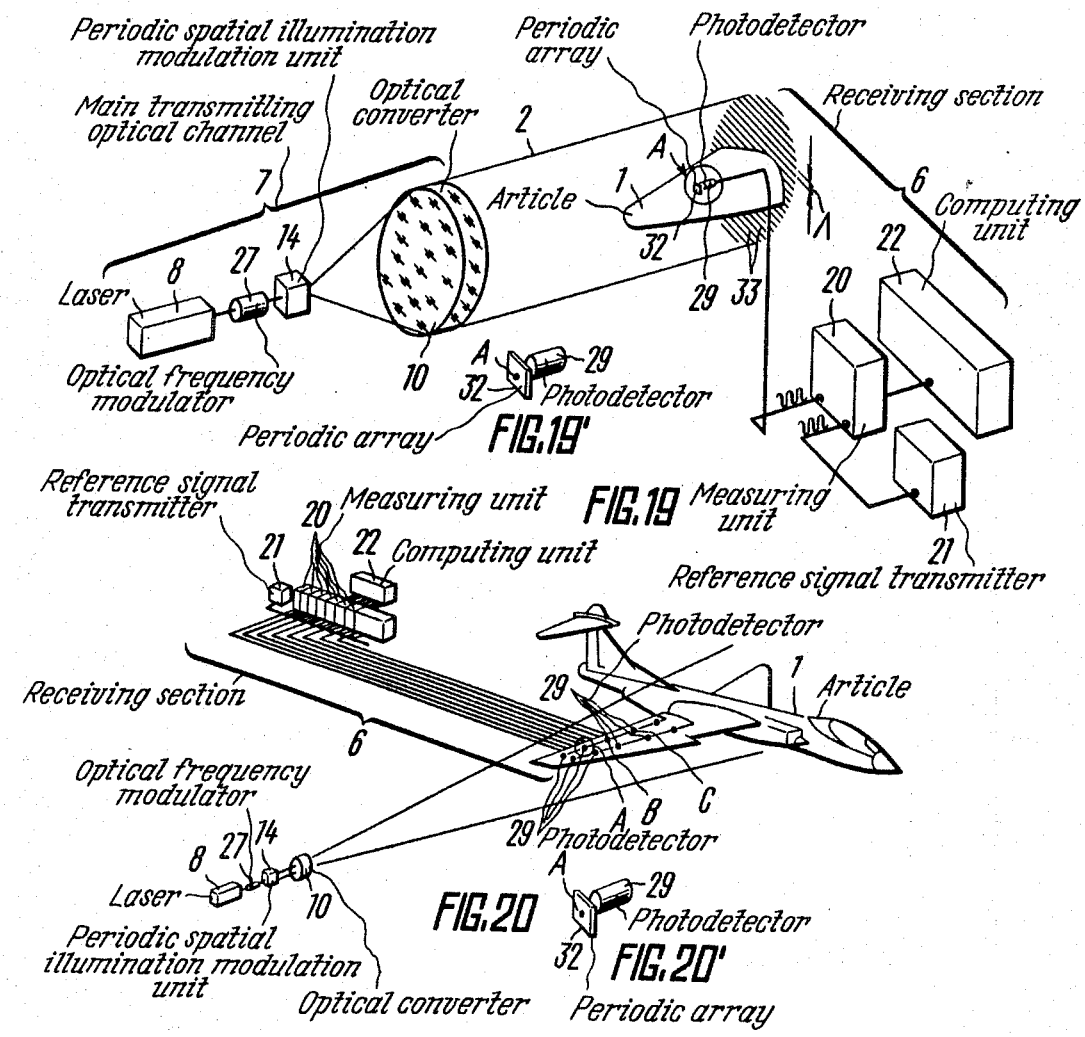

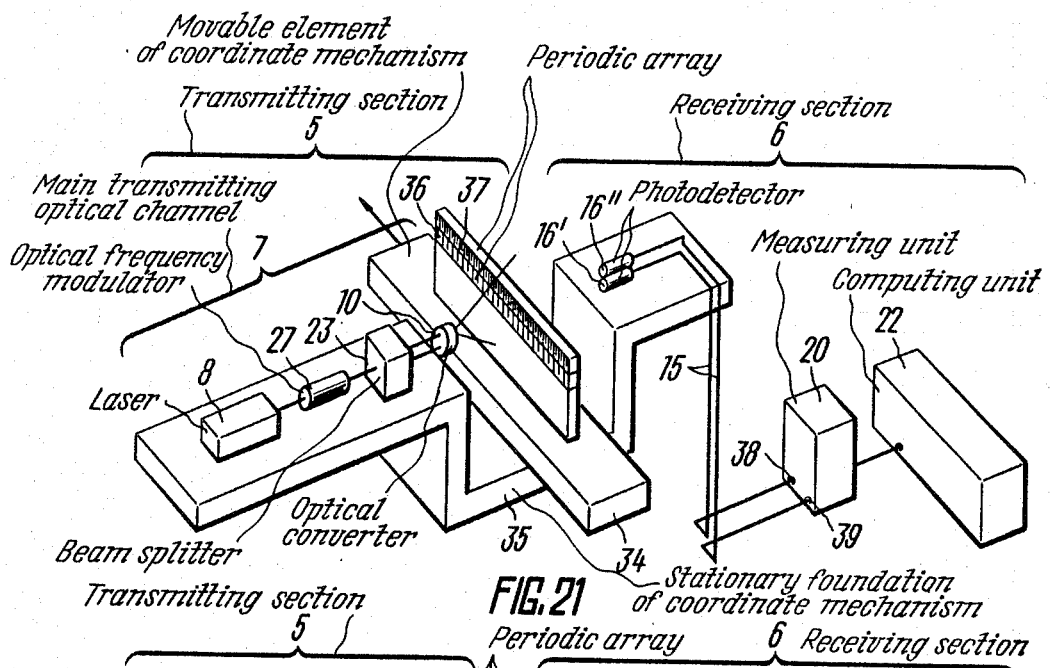
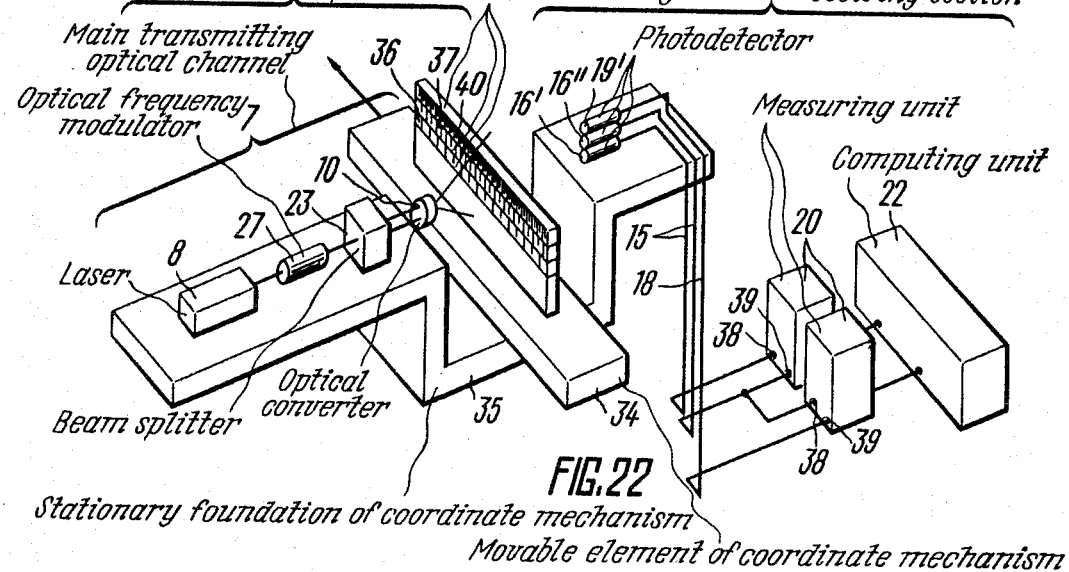

METHOD FOR SENSING SPATIAL COORDINATE OF ARTICLE POINT AND APPARATUS THEREFOR

FIELD OF THE INVENTION

The present invention relates to measurement technology and, in particular, to methods of sensing spatial coordinates of a point on an article and apparatuses therefor.

BACKGROUND

Known in the art is a process and apparatus for sensing spatial coordinates of a point on an article (cf., for example, Japanese Pat. No. 52-7938 NPC 106 c 34) wherein the process for sensing spatial coordinates of points of an article starts with forming a main coherent light field which is a δ-like spatial illumination distribution. The uniform time characteristic of this δ-like illumination distribution has been taken as the optical characteristic of the light field, effecting the one-to-one correspondence between the magnitude of the optical characteristic in the field point which coincides with the selected point of the article and the coordinate of this point. The uniform distribution is attained by uniform scanning of the selected point on said article by a narrow laser beam. The magnitude of the optical characteristic is then measured in this particular point of the main coherent light field. The magnitude of the optical characteristic is the time interval between the moment when the narrow laser beam meets the selected point of the article and the moment when scanning has begun. This time interval is the function of the position of the selected article point. The measured interval of time helps to find the coordinates of the selected point of the article in the direction of scanning. If the linear velocity is V, the coordinate x of the selected point of the article is equal to $$x = V.T, \qquad (1)$$

where T is the measured time interval between the beginning of scanning and the moment when the narrow laser beam meets the selected article point.

The known apparatus for sensing spatial coordinates of a selected point of an article comprises transmitting and receiving parts. The transmitting part is composed of the main transmitting optical channel which has a laser in order to produce a main coherent light field in the space near the article, an optical characteristic setting unit which is a unit scanning the selected article point by the laser beam in the direction of measurement, and an optical converter which forms a narrow laser beam. The receiving part of the apparatus comprises a main receiving channel having a photodetector aligned with said point of the article, and a measuring unit coupled to a coordinate measuring unit. In addition, the receiving part has a reference signal transmitter generating a scanning start signal. The photodetector is optically tied in with the selected point of the article by placing the photodetector directly in the selected point of the article.

The error of measuring the coordinate of a point by means of the proposed method and apparatus is basically dictated by the stability of the scanning velocity V and errors in defining the time interval T, which in principle cannot be sufficiently reduced due to the existing divergence of the laser beam.

Known in the art is a method for sensing spatial coordinates of a point of an article and an apparatus therefor (cf., for example, British Pat. No. 1,521,351, Cl. G 01 B 11/14, B 11/24, filed Jan. 19, 1976) wherein a coherent light field is formed on the surface of the article along one of the coordinate axes near the surface of the object, this light field being an array of uniformly spaced light planes. One of the optical characteristics of said light field is distribution of the phase thereof along the direction of measuring the coordinate of the article point. As the light field moves in relation to the article, the phase of this light field is continuously measured as from some initial moment of time. The measured phase helps to define the coordinate of the article point in relation to the element of the article where the light field phase has been measured at the initial moment.

The known apparatus for sensing spatial coordinates of an element of an article comprises transmitting and receiving parts. The transmitting part comprises a main transmitting optical channel which has a laser to produce a main coherent light field near the article, an optical characteristic setting unit which is a beam splitter, and an optical converter which is an objective lens. The receiving part of the apparatus comprises a photodetector optically aligned with the selected point of the article, and a measuring unit coupled to a coordinate measuring unit.

But these known methods and apparatus cannot measure the coordinates of a selected point of the article at any moment because, according to the invention, the article should be continuously scanned by the light field, starting from some initial point. Accidental interruptions of the measuring signal contribute to accumulation of the error in the coordinate of the selected point of the article. Such accidental interruptions of the measuring signal are accounted for by the static properties of light scattered by the surface of the article. Moreover, the above method and apparatus cannot directly measure the coordinates of a selected point of an article in relation to a point outside the article.

The closest prototype of the invention disclosed herein is the known method for sensing magnitude and direction of lateral displacement (cf., for example, U.S. Pat. No. 3,930,734, M Cl. G 01 B 9/02, Apr. 26, 1974) wherein in order to measure spatial coordinates of a point of an article along one of coordinate axes the following steps are taken:

a main coherent light field is produced in the area of the article, whose optical characteristic is a uniformly distributed phase through 0°–360° in the direction of measurement of the coordinates obtained by interference of two converging coherent light beams, the phase of the coherent field is determined in the point of the field coinciding with the selected element of the article, the coordinate of the selected point of the article is sensed by the measured phase magnitude in the direction of the coordinate measurement.

However, in this case to accurately measure the coordinates is a task involving a complicated technological operation of precision measurement of the light field phase. Thus, for example, if the article is 1 meter long in the direction of coordinate measurement, to measure the absolute coordinate of a point of the article with an absolute error of $10^{-4}$ m the phase of the coherent light field should be measured with an error of 0.036°, which is quite a difficult technological problem. The task becomes utterly impracticable if the coordinate of an element of the article is to be measured by the above method with an error comparable with the light wave length.

SUMMARY OF THE INVENTION

The main object of the present invention is to improve the accuracy of sensing a spatial coordinate of a point of an article.

Another object of the present invention is to improve reliability of measurement of a spatial coordinate of a point of an article.

Another important object of this invention is to make use of the optical heterodyning principle in order to convert the information on the phase of a coherent light field into an electrical RF signal.

Still another object of the invention is to optimize the process of measuring a spatial coordinate of a point of an article as a whole.

Yet another object of the present invention is to substantially simplify the apparatus for sensing a spatial coordinate of a point of an article and to unify the units thereof.

An additionally object of this invention is to apply the optical interference effect for multistage periodic spatial and temporal illumination modulation within the system of coherent light fields employed in the apparatus proposed in the invention.

One more object of the invention is to provide a highly accurate apparatus for sensing the position of a movable element of the coordinate mechanism.

These objects are achieved in a method for sensing a spatial coordinate of a point of an article, comprising the following steps:

forming, in the area of the article, a main coherent light field whose one optical characteristic ensures one-to-one correspondence between the magnitude of the optical characteristic in the point of said field, which coincides with the selected point of the article, and the coordinate of the selected point at least along one of the coordinate axes;

measuring the magnitude of the optical characteristic in said point of the main coherent light field;

determining, by the measured magnitude, the coordinate of the selected point of the article in the direction of the axis of the coordinate measurement, according to the invention, at least one additional coherent light field is formed in the area of the article, which has no interaction with the main light field and is characterized by spatial periodic illumination modulation;

and, concurrent with measuring the magnitude of the optical characteristic in the point of the main coherent light field, which coincides with the selected point of the article, the phase of the additional coherent light field is determined in the same point within the limits of $2\pi$ radians, and then the number of periods of the spatial periodic illumination modulation is found, the period where, at the moment of measurement, the selected point of the article occurs, as an integer difference between the ratio of the coordinate of the selected point of the article, which is found by the magnitude of the optical characteristic in the point of the main coherent light field, coinciding with the selected point of the article, to the period of the spatial periodic illumination modulation of the additional coherent light field, and the phase of said additional field in the same point, expressed in fractions of the period of the spatial periodic illumination modulation thereof;

the coordinate of a point of the article along the coordinate axis is determined as a sum of periods of the spatial illumination modulation of the additional coherent light field, whose summand number is less by one than the found number of the period of spatial illumination modulation and the measured phase expressed in fractions of the period of spatial illumination modulation.

This permits much higher accuracy of determination of a spatial coordinate of a point of an article and better reliability of measurements.

Advisably, the period of the spatial periodic illumination modulation of the additional coherent light field should exceed a double maximum error of measurement of the spatial coordinate of a selected point of the article, which is determined by the magnitude of the optical characteristic of the main coherent light field.

This permits unambiguous determination of the number of periods of the spatial periodic illumination modulation, wherein the selected point of the article occurs at the moment of measurement.

Advisably, as requirements to the accuracy of measurements grow, a number of additional coherent light fields should be formed, said fields having no interaction with the main field and between one another, and being characterized by spatial periodic illumination modulation. In this array the period of spatial periodic illumination modulation of each preceding additional field should be greater than the period of spatial periodic illumination modulation of the subsequent additional field. In addition to measuring the optical characteristic in the point of the main coherent light field, which coincides with the selected point of the article, it is necessary, for each next additional coherent field in the sequence, to determine the phase within the limits of $2\pi$ radians, in the same point and to define the number of the period of spatial periodic illumination modulation, wherein the selected point of the article occurs at the moment of measurement. This number is found as an integer of the difference between the ratio of the coordinate of the selected point of the article, which is determined by the number of the period of the spatial periodic illumination modulation and the phase, found by means of the preceding additional coherent light field, to the magnitude of the period of the spatial periodic illumination modulation of the additional coherent light field, and the field of said field in the same point, expressed in fractions of the period of the spatial periodic illumination modulation thereof. Then the coordinate of the point of the article along the coordinate axis is determined as a sum of the periods of the spatial illumination modulation of the additional coherent light field, whose summand number is less by one than the determined number of the period of the spatial illumination modulation and the measured phase expressed in fractions of the period of the spatial illumination modulation.

This permits obtaining potentially possible accuracy of determination of coordinates of a point of an article, that is the accuracy limited only by the stability of the laser and the shot noise of photodetectors.

The number of additional coherent light fields with spatial periodic illumination modulation in the given sequence is dictated by the assigned accuracy of measurement of a spatial coordinate of a point of an article.

Advisably, the period of spatial illumination modulation of each subsequent additional coherent light field should be greater than the double maximum error of measurement of a coordinate of an article point, said measurement being done by means of the preceding additional coherent light field, whereas the number of additional coherent light fields with spatial periodic illumination modulation in this sequence should be determined on the basis of the assigned accuracy of measurement of a spatial coordinate of an article point.

This permits unambiguous determination of the number of the period of the spatial periodic illumination modulation of the last additional coherent light field, wherein the article element occurs at the moment of measurement, and optimization of the process of coordinate measurement as a whole.

This object is also attained in an apparatus for realization of the method for sensing a spatial coordinate of an article element, comprising a transmitting section including a main transmitting optical channel to form, in the space near the article, a main coherent light field and having a laser; an optical characteristic setting unit to effect one-to-one correspondence of the magnitudes of said characteristic in the point of the field coinciding with the selected element of the article and the coordinate of said point in the measurement direction; an optical converter; a receiving section including a main receiving channel having a photodetector optically aligned with the selected point of the article; and a reference signal transmitter and a measuring unit coupled to a coordinate computing unit, according to the invention, the transmitting section comprises at least one additional transmitting channel including a laser and, arranged along the optical axis thereof, a periodic time illumination modulation unit, a periodic spatial illumination modulation unit and an optical converter, whereas the receiving section comprises an additional receiving channel including a photodetector optically aligned with the selected point of the article and a measuring unit coupled to said coordinate computing unit, the number of said additional transmitting and receiving channels being dictated by the required accuracy of determination of coordinates of the selected article point.

Advisably, in order to determine the spatial coordinates of several points of the article, the receiving section of the apparatus should comprise, for each point of the article, a main channel and at least one additional receiving channel, the measuring unit of each channel being connected to the coordinate computing unit.

In case fast response in not particularly required of the apparatus for sensing the spatial coordinates of the selected article point, advisably, the transmitting section of the apparatus should comprise an optical switch accommodated at the output of all transmitting optical channels, and the receiving section should comprise a photodetector optically aligned with the selected article point and a receiving channel switch whose input is connected to an output of the photodetector and to an output of the reference signal transmitter, and the output of the receiving channel switch is connected to the measuring units of the main and additional receiving channels.

This permits substantial simplification of the apparatus for sensing the spatial coordinates of a selected point of an article.

Advisably, in order to sense the spatial coordinates of several points of an article, when this sensing is not simultaneous, the receiving section of the apparatus should comprise photodetectors optically aligned with each point of the article, and a photodetector switch whose inputs are connected to outputs of the photodetectors and the output of the reference signal transmitter and whose output is connected to the input of the receiving channel switch, the outputs of the receiving channel switch being connected to the measuring units of the main and all additional receiving channels.

This permits substantial simplification of the apparatus for sensing the spatial coordinates of several points of an article.

The preferred embodiment of an apparatus for sensing the spatial coordinates of one of several points of an article should, advisably, have the main transmitting channel wherein an optical characteristic setting unit effecting one-to-one correspondence between the values of the optical characteristic and the coordinate of the article point is a sequence of units arranged successively along the laser optical axis, namely a periodic time illumination modulation unit and a periodic spatial illumination modulation unit, the measuring units in the main receiving channel and the additional receiving unit being identical.

This permits unification of receiving and transmitting channels and simplification of the apparatus design.

Advisably, the measuring unit of the additional receiving channel should be a phasemeter with a range of phase measuring from 0 to $2\pi$ radians.

Advisably, in order to sense variation of the spatial coordinate of an article point, the transmitting section should comprise a main transmitting optical channel and the receiving section should comprise a main receiving channel equipped with a periodic array disposed in front of the photodetector, secured rigidly thereto and aimed in the measurement direction. The period of the array coincides with the period of spatial illumination modulation of the main coherent light field, the measuring unit of said channel being a phasemeter with a phase measuring range of $0-2\pi N$ radians, where $N = 1,2,3 \ldots$, which is coupled to the coordinate computing unit.

This permits measurements of continuously varying coordinates of a selected article element, for example, when the article is vibrating.

Advisably, in order to sense the spatial coordinates of several article points, the receiving section of the apparatus should have a main receiving channel for each point of the article, whose measuring unit is a phasemeter connected to the coordinate computing unit and having a phase measuring range of $0-2\pi N$ radians, where $N = 1,2,3 \ldots$.

Possibly, the periodic spatial illumination modulation unit is a beam splitter.

This permits the use of interference of light waves in order to effect the periodic spatial modulation of illumination in coherent light fields employed in the proposed apparatus.

Advisably, in one of the embodiments of an apparatus for sensing a spatial coordinate of a selected point of an article and used for sensing the position of a movable element of a coordinate mechanism, the main transmitting channel should comprise a laser placed on the stationary foundation of the coordinate mechanism, several units being arranged on the optical axis of said laser, namely a periodic time illumination modulation unit, an optical converting unit and a periodic spatial illumination modulation unit, which is a beam splitter plus two periodic arrays whose periods are different and which are mounted on the movable element normal to the laser optical axis and are aimed in the direction of the motion of the movable element, whereas the main receiving channel should comprise photodetectors placed on the stationary foundation of the coordinate mechanism, one photodetector after each of the periodic arrays, which all are connected to the measuring unit connected to the coordinate computing unit, this measuring unit being a phasemeter with a phase measuring range of $0-2\pi$ radians.

Advisably, the number of periods of one array within the movable element position measuring range exceeds by one the number of periods of another array in the same range.

This permits one-to-one correspondence between the magnitudes of the optical characteristic of the main coherent light field and the coordinates of the selected article point, in this case the position of the movable element.

The output of the photodetector located after the array having less periods should be connected to a measuring input of the phasemeter, and the output of the photodetector located after the array having more periods should be connected to a reference input of the phasemeter.

Advisably, in the device for sensing the position of a movable element the additional transmitting optical channel should comprise a periodic array mounted on the movable element of the coordinate mechanism normal to the laser optical axis (of the main channel) and aimed in the direction of movement of the movable element. The number of periods of this array in the measuring range should exceed the number of periods of any array in the main channel by an integer number. The additional receiving channel should comprise a photodetector mounted on the stationary foundation of the coordinate mechanism after the array and a measuring unit which is a phasemeter with a phase measuring range of $0-2\pi$ radians, connected to the coordinate computing unit, and the output of said photodetector should be connected to the reference input of the phasemeter, whereas the measuring input of the phase meter is connected to the output of the photodetector of the main receiving channel, which is located after the array having less periods.

This permits higher accuracy of sensing the position of a movable element of a coordinate mechanism.

The number of periods of the array in the measuring range of each subsequent additional transmitting channel should exceed the number of periods of the array of the preceding additional optical channel by an integer number.

Advisably, in each subsequent additional receiving channel the output of the photodetector of this channel should also be connected to the reference input of the phasemeter of the preceding additional receiving channel.

This permits realization of potential accuracy in sensing the position of the movable element of the coordinate mechanism, which is limited by the noise of photodetectors and the stability of the laser frequency.

Advisably, in all the above embodiments of the apparatus the periodic time illumination modulation unit should be an optical frequency modulator for shifting the laser frequency, which is placed on the optical axis of said laser.

This permits conversion of information on the phase of the coherent light field into an electrical ratio frequency signal. High accuracy of measurements is guaranteed in this case.

BRIEF DESCRIPTION OF THE DRAWINGS

The invention will now be described in greater detail with reference to concrete embodiments thereof, taken in conjunction with the accompanying drawings, wherein:

FIG. 19 illustrates diagrammatically an apparatus for sensing a spatial coordinate of an article point continuously moving in space in relation to the initial position thereof, according to the invention;

FIG. 19' illustrates a photodetector and periodic array that can be used in the apparatus of FIG. 19;

FIG. 20 illustrates diagrammatically an apparatus for sensing spatial coordinates of several points of an article, moving in space, according to the invention;

FIG. 20' illustrates a photodetector and periodic array that can be used in the apparatus of FIG. 20;

FIG. 21 illustrates diagrammatically an apparatus for sensing the position of a movable element of a coordinate mechanism, showing main transmitting and a main receiving channels only, according to the invention;

FIG. 22 illustrates diagrammatically an apparatus for sensing the position of a movable element of a coordinate mechanism, showing one additional transmitting optical channel and one additional receiving channel, according to the invention;

BEST MODE FOR CARRYING OUT THE INVENTION

The disclosed method for sensing a spatial coordinate of an article point is realized as follows.

Figure 1:
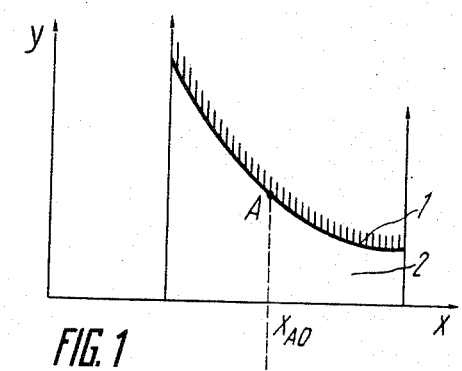
FIG. 1 illustrates diagrammatically relative positions of an article and a main coherent light field, according to the invention.
Figure 2:
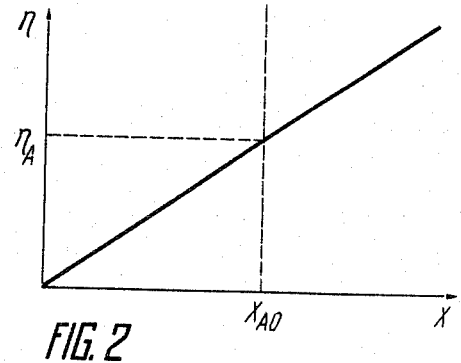
FIG. 2 illustrates diagrammatically the principle of sensing the coordinate $X_A$ of the point A of the article by means of the main coherent light field, according to the invention.

Suppose that spatial coordinates $X_A$ of the point A of the article 1 (FIG. 1) are to be sensed. To this end a coherent light field 2 is formed in the area of the article 1. This field 2 is the main field formed so that one of the optical characteristics $\eta$ ensures one-to-one correspondence between the magnitude $\eta_A$ at the point in the field, which coincides with the selected point A of the article, and the true coordinate $X_A$ of the point A of the article along one of the coordinate axes (FIG. 2). Such optical characteristic may be:

uniform spatial distribution of illumination throughout the range of measurement of coordinates of selected points of the article, or uniform spatial distribution of a light field phase, which can be obtained by, for example, interference of light waves as described above in the U.S. Pat. No. 3,930,734, or uniform time distribution of $\delta$-like illumination, which can be performed by uniform scanning of an article by a narrow light beam, as described in FRG Pat. No. 2,157,813, IPC OIB 11/06 filed Nov. 22, 1971, or the U.S. Pat. No. 3,781,115, IPC OIB 11/00, OIB 11/04, OIB 11/30 filed Apr. 2, 1972.

Then the magnitude $\eta_A$ of the optical characteristic is measured at the point in the main coherent light field, which coincides with the point A of the article. In one instance it can be light irradiance, in another—a phase, in a third instance—a time interval.

Measurement is by any known method, for example, by converting an optical signal into an electrical signal to be measured by a voltmeter, phasemeter, or time interval meter, etc. The measured magnitude of the optical characteristic serves to find the magnitude $X_{A0}$ of the coordinate of the point A of the article in the direction of the axis X along which the measurement is done, as an approximation of the true magnitude $X_A$.

In this manner the magnitude $X_{A0}$ of the coordinate of the point A of the article is obtained along one of the coordinate axes. In a similar manner the coordinates of the point A of the article are determined along other coordinate axes.

Figure 3:
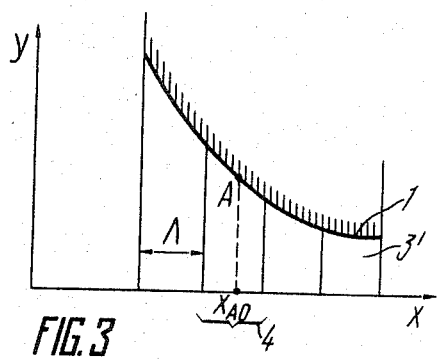
FIG. 3 illustrates diagrammatically relative positions of an article and an additional coherent light field, according to the invention.

If the accuracy of measurement $(X_A - X_{A0})/X_A$ of the magnitudes of coordinates is insufficient, then, according to the invention, at least one additional coherent field 3' is formed. This field 3' has no interaction with the main light field 2 and possesses spatial periodic modulation of illumination (FIG. 3). The spatial periodic modulation of illumination is obtained by any known method, for example, by interference of two (or several) intersecting coherent light beams, as described in already mentioned British Pat. No. 1,521,351 or U.S. Pat. No. 3,930,734.

Figure 4:
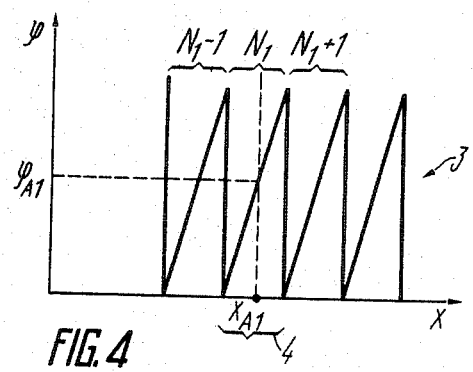
FIG. 4 illustrates diagrammatically the phase distribution in the additional coherent light field along the selected coordinate axis, according to the invention.

In this case the point A occurs at the moment of measurement of the coordinate thereof in one of the periods 4 of the spatial modulation of illumination (FIG. 4). In order to find the coordinate $X_{AI}$, as the next approximation of the true magnitude $X_A$, the number $N_1$ of this period of spatial modulation of illumination is found and the phase $\phi_{A1}$ of the additional coherent light field is determined in the point A within the range of $2\pi$ radians. Then the coordinate $X_{AI}$ of the point A of the article along the selected axis is determined as a sum of periods $\Lambda_1$ of the spatial modulation of illumination of the additional coherent light field. The number of summands of this sum is less by one than the found number of the period of the spatial modulation of illumination and the measured phase expressed in fractions of the period of the spatial modulation of illumination $$X_{AI} = \sum_{i=1}^{i=N_1-1} \Lambda_1 + \frac{\phi_{A1}}{2\pi} \Lambda_1 = (N_1 - 1)\Lambda_1 + \frac{\phi_{A1}}{2\pi} \Lambda_1, \quad (2)$$

where:

$X_{AI}$—unknown coordinate of the point A of the article;

$N_1$—number of the period of spatial modulation of illumination, wherein the point A of the article occurs at the moment of measurement;

$\phi_{A1}$—measured phase of the additional coherent light field 3' in the point A within the range of 0-2$\pi$ radians;

$\Lambda_1$—magnitude of the period of spatial periodic modulation of illumination of the additional coherent light field 3'.

The number $N_1$ of the period of the spatial periodic modulation of illumination, wherein the point A occurs at the moment of measurement can be found as follows.

Figure 5:
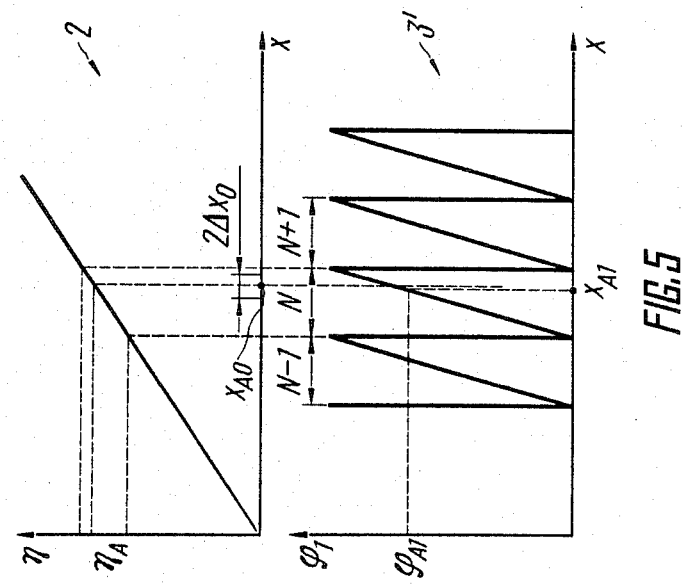
FIG. 5 illustrates diagrammatically the principle of determination of the number of the period of spatial modulation of illumination of the additional coherent light field, wherein the point A of the article occurs at the moment of measurement, according to the invention.

Assume that $X_{A0}$ is the magnitude of the coordinate of the point A of the article (FIG. 5), which is determined by the magnitude of the optical characteristic in the point of the main coherent light field, which coincides with the selected point of the article. This magnitude is determined with a certain error $\pm \Delta X_o$ with respect to the true magnitude $X_A$ of the coordinate of the point A of the article so that:

$$X_{A0} = X_A \pm \Delta X_o \quad (3)$$

Divide this equality by the magnitude of the period $\Lambda_1$ of the spatial periodic modulation of illumination $$(X_{A0}/\Lambda_1) = (X_A/\Lambda_1) \pm (X_0/\Lambda_1) \quad (4)$$

and subtract from both parts the magnitude of the measured phase $\phi_{A1}$, expressed in radians, of the additional coherent light field 3' in the point A of the article:

$$(X_{A0}/\Lambda_1)(\phi_{A1}/2\pi) = (X_A/\Lambda_1) - (\phi_{A1}/2\pi) \pm (\Delta X_o/\Lambda_1) \quad (5)$$

the magnitude of the phase $\Lambda 100\ _{A1}$ is not measured with a certain error $\Delta\phi$ so that $$(\phi_{A1}/2\pi) = (\phi_{A1}{}^{t2}/2\pi) \pm (\Delta\phi/2\pi), \quad (6)$$

where: $\phi_{A1}{}^{t2}$—the true magnitude of the phase of the additional coherent light field in the point A of the article.

Finally, it can be written:

$$(X_{A0}/\Lambda_1) - (\phi_{A1}/2\pi) = (X_A/\Lambda_1) - (\phi_{A1}{}^{t2}/2\pi) \pm (\Delta\phi/2\pi) \pm (\Delta X_o/\Lambda_1) \quad (7)$$

Evidently, the value $(X_A/\Lambda_1) - (\phi_{A1}{}^{t2}/2\pi)$ is the unknown number $N_1$ of the period of spatial modulation of illumination, wherein the point A of the article occurs at the moment of measurement. This number can be found as the nearest integer to the quantity $(X_{A0}/\Lambda_1) - (\phi_{A1}/2\pi) + \frac{1}{2}$, that is, $$N_1 = int\left( \frac{X_{A0}}{\Lambda_1} - \frac{\phi_{A1}}{2\pi} + \frac{1}{2} \right) \quad (8)$$

on condition that $\left| \pm \frac{\Delta\phi}{2\pi} \pm \frac{\Delta X_0}{\Lambda_1} + \frac{1}{2} \right| < 1$ here: int(Z) means an integer nearest to Z, but not more than Z. For example: int(4,3)=4, int(0.1)=0, int.(−4,3)=−5.

Thus, the number of the period of spatial periodic modulation of illumination, wherein the point A of the article occurs at the moment of measurement, is found as an integer of the difference between the ratio of the magnitude of the coordinate $X_{0A}$ of the point A of the article, which is determined by the magnitude of the optical characteristic in the point of the main coherent light field 2, and which coincides with the selected point of the article, to the magnitude $\Lambda_1$ of the period of spatial periodic modulation of illumination of the additional coherent light field 3' and the phase $\phi_{A1}$ of this additional field 3' in the same point, expressed as a fraction of the period of the spatial modulation of illumination of this additional field 3'.

If the accuracy of the coordinate of the point A, found in this way, is insufficient, another (second) additional coherent light field 3'' is formed, also possessing spatial periodic modulation of illumination.

Figure 6:
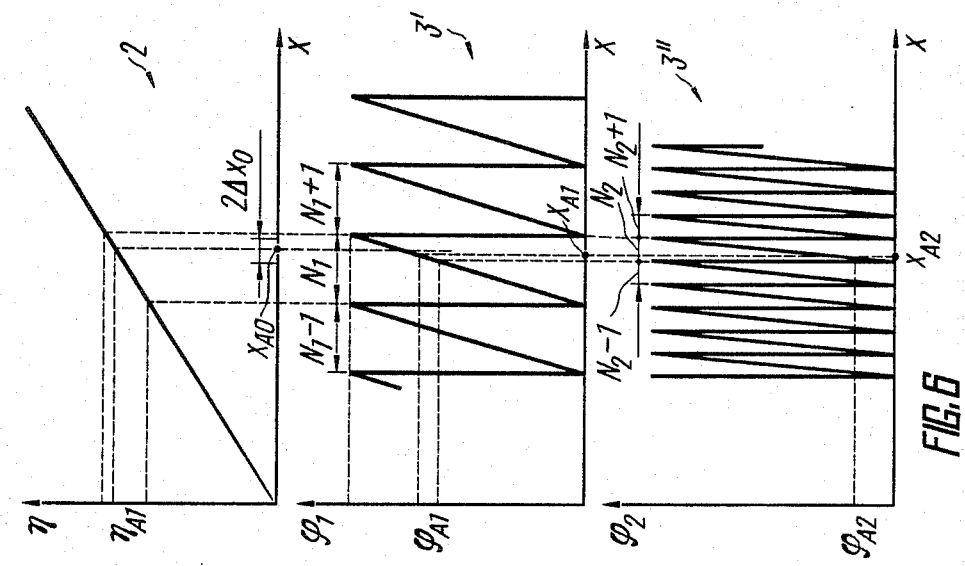
FIG. 6 illustrates diagrammatically the principle of finding the number of the period of spatial modulation of illumination of a second additional coherent light field, wherein the point A of the article occurs at the moment of measurement, according to the invention.

The spatial periodic modulation of illumination can be obtained by any of the known methods, for example, by interference of two (or several) intersecting coherent light beams, as described in already cited British Pat. No. 1,521,251 or U.S. Pat. No. 3,930,734. In this case the point A of the article occurs at the moment of measurement in one particular period of the spatial modulation of illumination in each of the additional coherent light fields (FIG. 6). In order to find the unknown coordinate $X_{A2}$ of the point A of the article 1 in the second additional field 3'', the number $N_2$ of the period of the spatial modulation of illumination, wherein the point A occurs at the moment of measurement, is determined, as well as the phase $\phi_{A2}$ within the range of $2\pi$ rad. Then the coordinate $X_{A2}$ of the point A of the article along the selected coordinate axis is determined as a sum of periods of the spatial modulation of illumination of the second additional coherent light field 3''. The number of summands of this sum is less by one than the already determined number $N_2$ and the measured phase $\phi_{A2}$ expressed in fractions of the period of the spatial modulation of illumation:

$$X_{A2} = \sum_{i=1}^{i=N_2-1} \Lambda_2 + \frac{\phi_{A2}}{2\pi} \Lambda_2 = (N_2 - 1)\Lambda_2 + \frac{\phi_{A2}}{2\pi} \Lambda_2, \quad (9)$$

where:

$X_{A2}$—unknown coordinate of the point A of the article;

$N_2$—number of the period of spatial modulation of illumination of the second additional coherent light field 3'', wherein the point A of the article occurs at the moment of measurement;

$\phi_{A2}$—measured phase of the second additional coherent light field 3'' in the point A within a range of $0-2\pi$ radians;

$\Lambda_2$—magnitude of the period of the spatial periodic modulation of illumination of the second additional coherent light field 3''.

The number $N_2$ of the period of the spatial periodic modulation of illumination, wherein the point A of the article occurs at the moment of measurement, is determined with the aid of the magnitude of the coordinate $X_{AI}$ of the point A of the article, which is measured by means of the previous main and additional fields by the same technique as applied to determine the magnitude of the coordinate $X_{A1}$.

$$N_2 = int\left( \frac{X_{A1}}{\Lambda_2} - \frac{\phi_{A2}}{2} + \frac{1}{2} \right) \quad (10)$$

Here, as before, int(Z) signifies an integer closest to, but not exceeding Z.

In a general case, to meet the requirements of the accuracy of determination of a coordinate of the point A, according to the present invention, a set of n additional coherent light fields (3', 3'', 3''', ... 3ⁿ) with the spatial periodic modulation of illumination is formed simultaneously, these fields having no interaction between one another.

Following the above succession, more and more accurate magnitudes of the coordinates $X_{Ai}$ (i=0.1, ... n−1) are obtained. In the last (n-th) additional coherent light field 3 has number $N_n$ of the period of spatial modulation of illumination, wherein the point A occurs at the moment of measurement, is determined. In the same additional field the phase $\phi_{An}$ in the point A is found within a range of $2\pi$ radians. Then as described above, the coordinate $X_A$ of the point A along the selected axis is determined as a sum $N_n - 1$ of periods of spatial modulation of illumination and the measured phase $\phi_{An}$ expressed in fractions of the period of the spatial modulation of illumination.

If specific requirements to the accuracy of determination of coordinates of the point A along a selected axis are known, for example, a relative error $(X_A - X_{An})/X_A = \delta_x$ is assigned, and, if the error of measurement of the phase $\Delta\phi$ in the additional coherent fields is known, the number n of additional coherent light fields and the ratio $m = \Lambda_i/\Lambda_{i+1}$ of the periods of spatial periodic modulation in adjacent fields is found in accordance with the formulae:

$$n = int \frac{lg\left(\frac{\Delta\phi}{2\pi} \cdot \frac{1}{\delta_x}\right)}{lg \frac{\pi}{\Delta\phi}} + 1; m = \frac{\Lambda_i}{\Lambda_{i+1}} < \frac{\pi}{\Delta\phi} - 1 \quad (11)$$

where: $m = \Lambda_1/\Lambda_{i+1}$—ratio of the period of the spatial periodic modulation of illumination of an i-th coherent light field to the period of the spatial periodic modulation of illumination of an i+1th field.

Thus, for example, if the assigned relative error is $\delta_x = 10^{-3}$ and the phase measuring error is $\Delta\phi = 10° = 0.17$ radians, then:

$$n = int (1.4/1.2) + 1 = 1 + 1 = 2$$

In this example in order to ensure measuring of coordinates of a point A with an error $\delta_x = 10^{-3}$, providing the phase can be measured with an error of 10°, two additional coherent light fields are to be formed. The ratio m of the period of the spatial modulation of the preceding field to the subsequent field can be written as:

$$m < (\pi/0.17) - 1 \approx 17.47$$

and, as m is more convenient as an integer, m is equal to 17.

Figure 7:
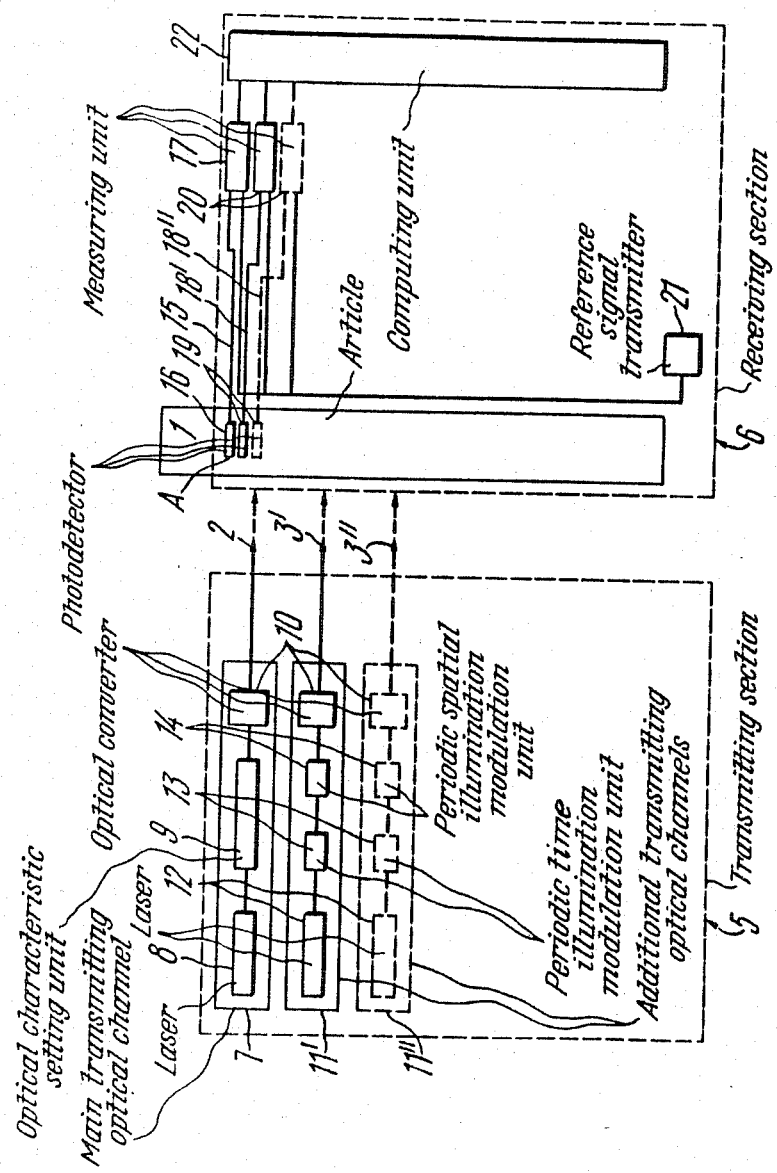
FIG. 7 illustrates a skeleton diagram of an apparatus for sensing a coordinate of a selected article point, having a main transmitting optical channel, a main receiving channel and at least one additional transmitting optical channel and one additional receiving channel, according to the invention.

The disclosed apparatus for realization of the method for sensing a spatial coordinate of a point A of the article 1 comprises (FIG. 7) a transmitting section 5 and a receiving section 6.

The transmitting section 5 comprises:

a main transmitting optical channel 7 intended to form, in the area of the article 1, a main coherent light field 2. The channel 7 comprises a laser 8, an optical characteristic setting unit 9 effecting one-to-one correspondence between the magnitudes thereof in the point of the field, which coincides with the point A of the article 1 and the coordinate of said point in the direction of measurement, and an optical converter 10, such as, for example, an objective lens for generating the light field 2 of required dimensions in the vicinity of the article 1;

at least one additional optical channel 11' intended to form, in the area of the article 1, an additional coherent light field 3'. The channel 11' comprises a laser 12 and several units arranged on the optical axis thereof, namely: a periodic time illumination modulation unit 13, a periodic, spatial illumination modulation unit 14 and an optical converter 10, such as for example, an objective lens.

The receiving section 6 comprises:

a main receiving channel 15 having a photodetector 14 optically aligned with the point A of the article 1, and a measuring unit 17;

at least one additional receiving channel 18' having a photodetector 19 optically aligned with the point A of the article 1, and a measuring unit 20;

a reference signal transmitter 21 connected to the measuring unit 17 of the main receiving channel and to the measuring unit 20 of the additional receiving channel 18';

a coordinate computing unit 22 connected to the measuring unit 17 of the main receiving channel 15 and to the measuring unit 20 of the additional receiving channel 18'.

The coordinate computing unit 22 can be, for example, a computer intended to make use of the data obtained in the main and additional receiving channels and compute on the basis of formulae (2,8,9,10) the coordinates of the point A of the article 1 in the direction of measurement.

The photodetectors 16 and 19 of the main channel 15 and the additional channel 18' can be optically aligned with the point A of the article 1 by means, for example, of a lens (not shown) bringing the image of the point A to the input diaphragms (not shown) of the photodetectors 16 and 19, or by placing the photodetectors 16 and 19 directly in the point A of the article.

The optical characteristic setting unit 9 of the main transmitting optical channel 7 can be, for example, an optical element scanning the photodetector 16 positioned on the surface of the article 1 by a narrow laser beam in the direction of measurement, as described in Japanese Pat. No. 52-7983 NPC 106c34. In this case the optical characteristic effecting one-to-one correspondence between the magnitudes thereof in the point A and the coordinate of this point A in the direction of sensing is the sequence of time intervals between the beginning of scanning and the moment the photodetector 16 generates a signal.

Figure 8:
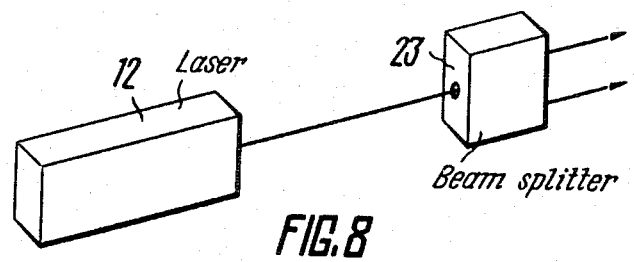
FIG. 8 illustrates the relative positions of a laser and a periodic spatial illumination modulation unit which is a beam splitter, according to the invention.
Figure 9:
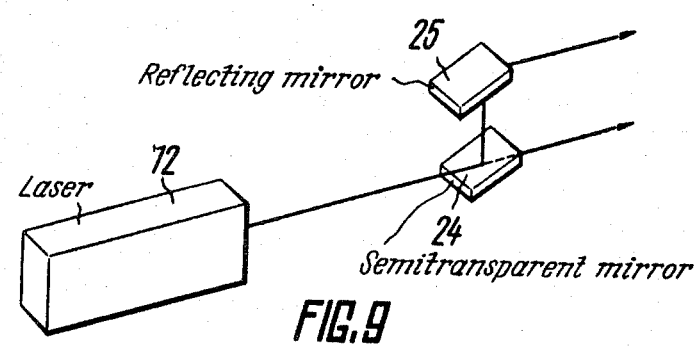
FIG. 9 illustrates a diagram of laser beam splitting by means of a two-mirror splitter, according to the invention.
Figure 10:
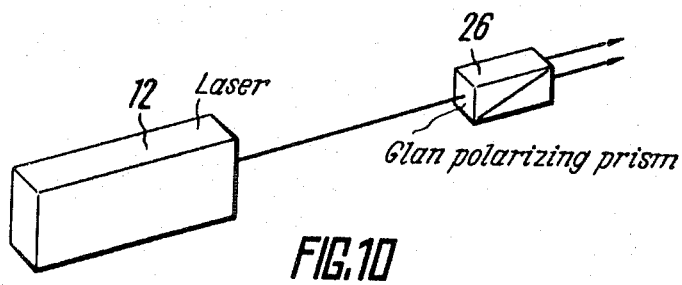
FIG. 10 illustrates a diagram of beam splitting by means of a Glan polarizing prism, according to the invention.

Periodic spatial modulation of illumination in the additional coherent light fields is performed, as has been described above, by means of interference of two (or several) mutually coherent laser beams intersecting near the article 1. In order to realize periodic spatial modulation of illumination of an additional coherent light field the periodic spatial illumination modulation unit 14 is made as a beam splitter 23 (FIG. 8). The beam splitter 23 ensures in a specific point in space a required frequency of periodic spatial modulation of illumination of the additional coherent light field. Referring to FIGS. 9 and 10, different diagrams of beam splitting are given as examples. Referring to FIG. 9, the diagram shows splitting of beams by means of two mirrors, a semitransparent mirror 24 and a fully reflecting mirror 25. Referring to FIG. 10, the diagram shows splitting of beams by means of a Glan polarizing prism 26.

Figure 11:
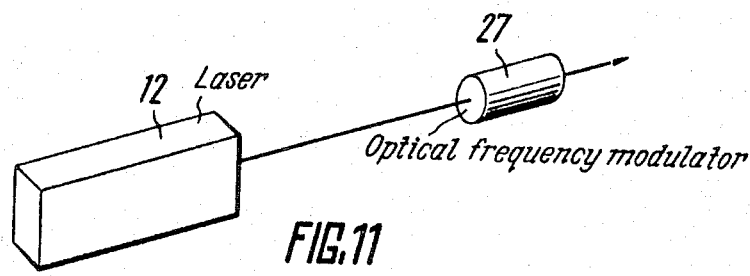
FIG. 11 illustrates mutual arrangement, on the laser optical axis, of a periodic time illumination modulation unit, which is an optical frequency modulator, according to the invention.

In order to realize periodic time modulation of illumination of an additional coherent light field, the periodic time illumination modulation unit 13 (FIG. 7) in the additional transmitting optical channel 11 is an optical frequency modulator 27 (FIG. 11) which shifts the frequency of laser radiation of one of said interfering beams to a quantity $\Omega$ within the radio frequency range. Evidently, if somewhere in space two mutually coherent beams $E_1 = E_{10} \exp -i(\vec{k_1}\vec{r} - w_1 t)$ and $E_2 = E_{20} \exp -i(\vec{k_2}\vec{r} - w_2 t)$ intersect, where $E_{10}$ and $E_{20}$ are beam amplitudes, $k_1$ and $k_2$ are wave vectors, and r is the position vector of the point A in space, then, as is known, the result of interference of beams in space is an interference pattern, the illumination J being distributed as:

$$J = E_{10}^2 + E_{20}^2 + 2E_{10}E_{20}\cos(\vec{k_1} - \vec{k_2})\vec{r} + \Omega t \quad (12)$$

The measuring unit 20 is a phasemeter with a phase measuring range of $0-2\pi$ radians.

The number of additional transmitting and receiving channels is selected on the basis of the assigned error $\Delta X$ of measurement of the coordinate $X_A$ of the point A of the article 1 and the error $\Delta\phi$ of measurement of the phase of the electrical signal of the photodetectors 19 belonging to the additional channels 18, for example, by the formula (11). The higher the requirements of the accuracy of coordinate measuring, the more additional channels are to be formed.

The reference signal transmitter 21 is designed to set the beginning of coordinate measuring. The reference signal transmitter 21 can be, for example, a sinusoidal voltage generator (not shown) connected to the optical frequency modulator 27 which shifts the frequency of laser radiation.

Figure 12:
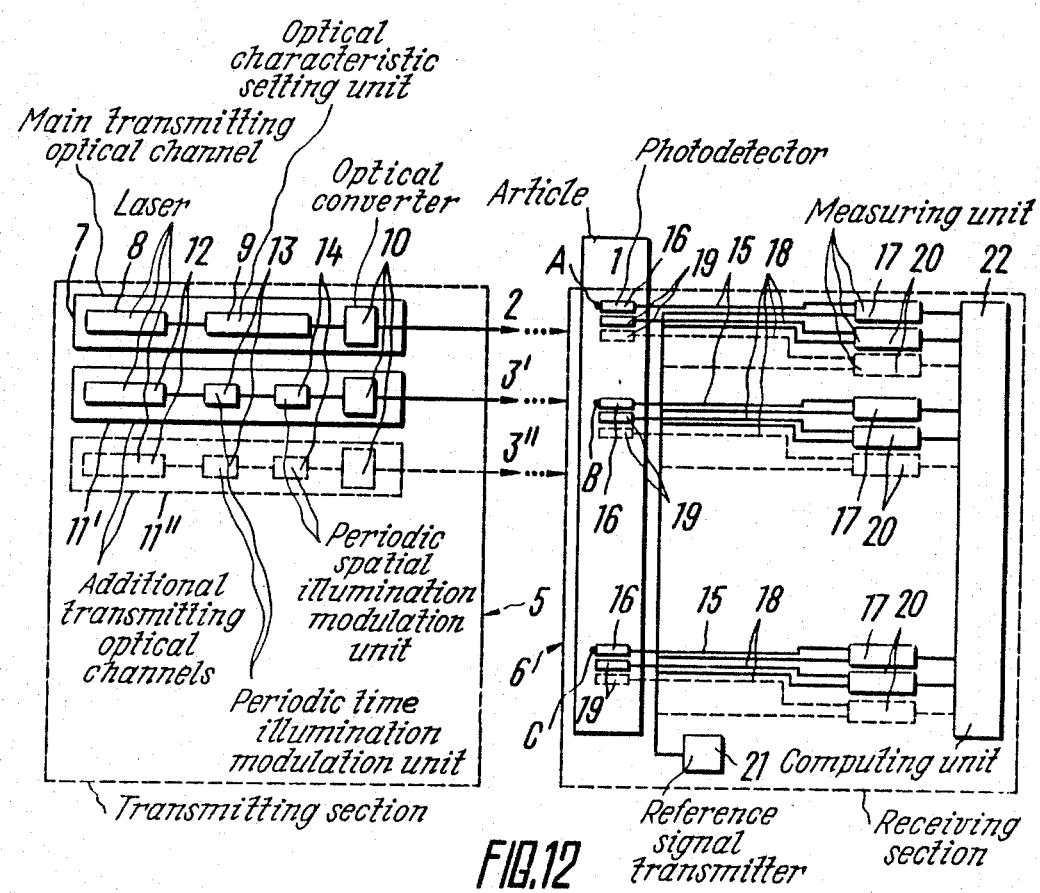
FIG. 12 illustrates a skeleton diagram of an apparatus for sensing the coordinates of several points of an article, according to the invention.

In case spatial coordinates of two points of the article, for example, point A and point B, are to be determined, the receiving section 6 of the proposed apparatus (FIG. 12) comprises photodetectors 16 and 19 of the main receiving channel 15 and additional receiving channels 18 for each point A and B of the article 1, respectively. Each photodetector is connected to the respective measuring unit 17 and 20 and the reference signal transmitter 21.

In case spatial coordinates of several points of an article are to be determined, the receiving section of the proposed apparatus (FIG. 12) comprises, for each point of the article 1, for example, points A,B,C, photodetectors 16 and 19 of the main receiving channel 15 and additional receiving channels 18, respectively. Each photodetector is connected to respective measuring units 17 and 20 and to the reference signal transmitter 21.

These photodetectors 16 and 19 are aligned optically with a respective point of the article 1, for example, as above, by means of a lens bringing the image of the point of the article to diaphragms of said photodetectors, or by placing these photodetectors directly in each of the selected points of the article.

The measuring units 17 and 20 are connected, as before, to the coordinate computing unit 22.

The speed of response of the apparatus depends largely on the power of the lasers and the transmission band of the computers of the receiving section.

Figure 13:
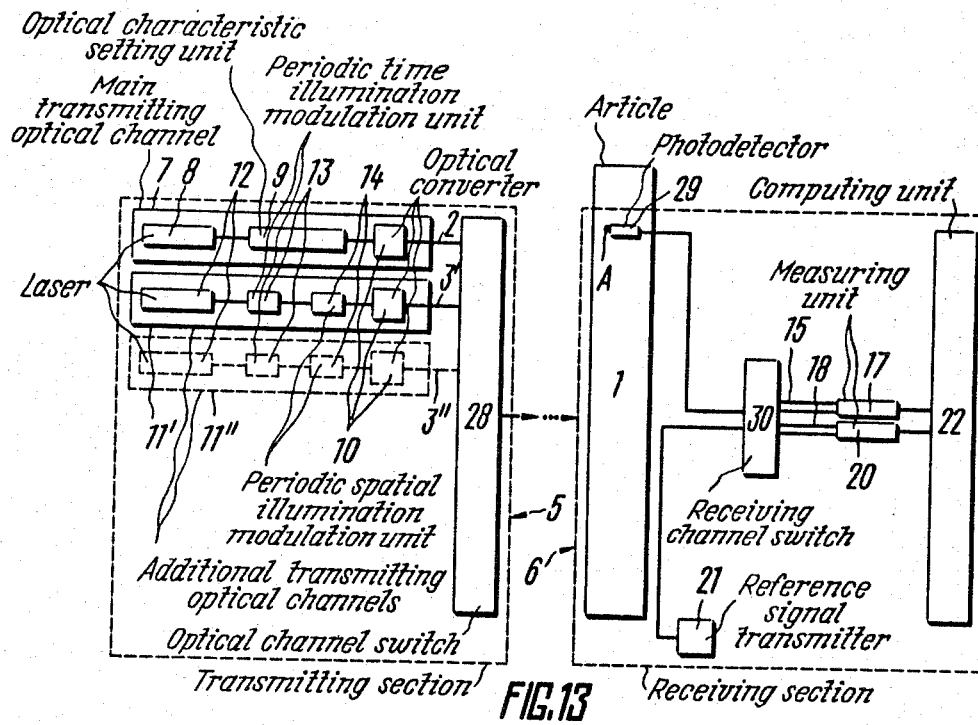
FIG. 13 illustrates a skeleton diagram of an apparatus for sensing a spatial coordinate of an article point, equipped with switches, according to the invention.

In case the speed of response is unimportant, it is advisable that in the receiving section 6 of the apparatus (FIG. 13) an optical channel switch 28 is installed at the output of all transmitting optical channels. This switch 28 can, on command, turn on and off the laser beams generated by the main transmitting optical channel 7 and additional transmitting optical channels 11. This permits equipping of the receiving section 6 with only one additional receiving channel 18 comprising a photodetector 29 and a measuring unit 20 connected to said photodetector 29. The receiving section 6 should in this case be furnished with a receiving channel switch 30 to operate synchronously with the optical channel switch 28 in distributing the outputs of the photodetectors 29 and the reference signal transmitter 21 among the measuring units of the main receiving channel 15 and the additional receiving channel 18.

Moreover, introduction of an optical channel switch 28 into the apparatus, as well as a receiving channel switch 30, permits substantial simplification of rendering independent the main coherent light field 2 and additional coherent light fields 3.

The measuring unit 20 is a phasemeter with a phase measuring range of $0-2\pi$ radians.

The apparatus operates as follows.

The optical channel switch 28 turns on the main coherent light field produced by the main transmitting optical channel 7. The output of the photodetector 29, optically aligned with the point A of the article, and the output of the reference signal transmitter 21 at this moment are connected, by means of the receiving channel switch 30, to the measuring unit 17 of the main receiving channel 15, which measures and delivers to the coordinate computing unit 22 quantities $\eta_A$ of the optical characteristic of the main coherent light field at the point A. Then the optical channel switch 28 switches transmitting optical channels, and turns on the first of the additional transmitting optical channels 11'. At this moment the receiving channel switch 30 simultaneously connects the outputs of the photodetector 29 and of the reference signal transmitter 21 to the input of the measuring unit 20 of the additional receiving channel 18, which measures the magnitude of the phase $\phi_A$ of the electrical signal of the photodetector 29, which, as has been already mentioned above, coincides with the magnitude of the phase of the first additional coherent light field at the point A, and supplies said quantity to the computing unit 22. In this manner, making use of the synchronous operation of the optical switch 28 and the receiving channel switch 30, the optical characteristic of the main coherent light field 2 and the phase of each additional coherent light fields 3 are measured at the point A of the article 1 and stored. On obtaining this information, the coordinate computing unit 22 calculates the coordinate of the point A of the article in accordance with the above formulae (2,8,9,10).

Figure 14:
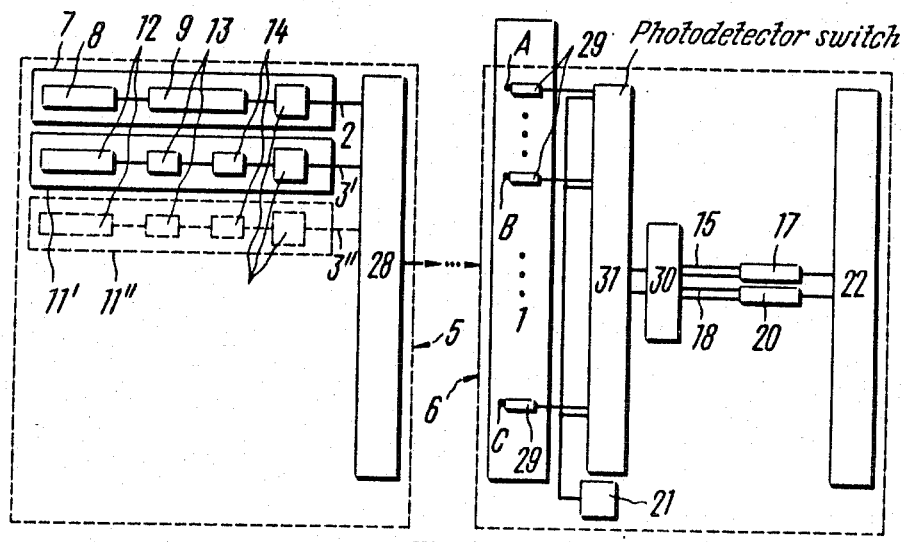
FIG. 14 illustrates a skeleton diagram of an apparatus for sensing spatial coordinates of several points of an article, equipped with switches, according to the invention.

In case fast response of the apparatus in sensing coordinates of several article points is not required, it is advisable that the receiving section 6 of the apparatus (FIG. 14) which comprises in the transmitting section 5 thereof an optical channel switch 28 and in the receiving section 6 thereof a photodetector 29 optically aligned with the point A of the article 1, whose output together with the output of the reference signal transmitter 21 are connected via the receiving channel switch 30 to the measuring units 17 and 20, should have, for each of the selected points of the article, for example, for points A,B,C, a photodetector 29 (FIG. 14) optically aligned with a respective point A,B,C of the article. A photodetector switch 31 is introduced before the receiving channel switch 30.

This permits introduction of only one additional receiving channel 18 in the receiving section 6 of the apparatus, which comprises one photodetector 29 and a receiving channel switch 30 of the measuring unit 20 connected to the photodetector 29 via the photodetector switch 31. The photodetector switch 31 substantially simplifies the circuit of the apparatus.

The apparatus operates as follows.

The optical channel switch controlled by the coordinate computing unit 22 turns on the main coherent light field 2 formed by the main transmitting optical channel 7. The output of the photodetector 29, optically aligned with, for example, the point A of the article 1, is connected at the same moment to the input of the receiving channel switch 30 together with the output of the reference signal transmitter 21. The receiving channel switch 30 connects the output of the photodetector 29 and the output of the transmitter 21 to the measuring unit 17 of the main receiving channel 15, which measures the magnitude of the optical characteristic of the main coherent light field at the point A and feeds the data to the coordinate computing unit 22.

The optical channel switch 28 turns off the main transmitting optical channel 7 and turns on the additional coherent light field 3' produced by the first channel 11' of the additional transmitting optical channels 11. At this moment the receiving channel switch 30 connects the output of the photodetector 29 and the output of the transmitter 21 to the input of the measuring unit 20 of the additional receiving channel, which measures magnitudes of the phase $\phi_A$ of the electrical signal of this photodetector and feeds the data into the coordinate computing unit 22. Similarly, the synchronously operating optical channel switch 28 and the receiving channel switch 30 measure and store magnitudes of phases of all subsequent additional optical coherent light fields at the point A of the article. Finally, on the basis of the data thus obtained the coordinate computing unit 22 calculates a coordinate of the point A according to the formulae (2,8,9,10).

Further on, the photodetector switch 31 connects the input of the receiving channel switch 30 to the output of the reference signal transmitter 21 together with the output of another photodetector 29 optically aligned with, for example, the point B of the article and the measurement process is repeated.

The coordinate computing unit 22 controls the operation of the optical channel switch 28, the photodetector switch 31 and the receiving channel switch 30.

Figure 15:
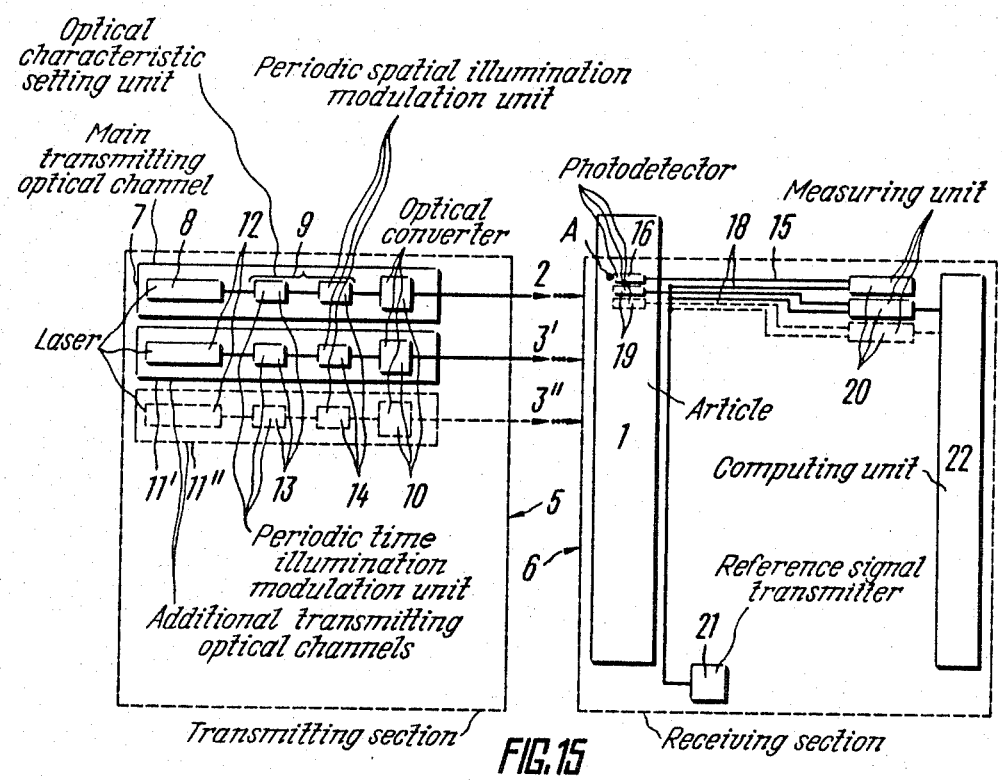
FIG. 15 illustrates a skeleton diagram of an apparatus for sensing a spatial coordinate of a selected point of an article, wherein the main transmitting and receiving channels are similar to the additional transmitting and receiving channels, according to the invention.

In another embodiment of the apparatus for realizing a method for sensing spatial coordinates of the point A, the main transmitting optical channel 7 of the receiving section 5 of the apparatus (FIG. 15) is similar in design to the additional transmitting optical channel 11 and comprises a laser 8, an optical characteristic setting unit 9 which realizes one-to-one correspondence between magnitudes of said optical characteristic in the point of the light field, coinciding with the point A of the article and the coordinate of said point in the direction of measurement, and which is composed of a periodic time illumination modulation unit 13 and a periodic spatial illumination modulation unit 14 arranged on the optical axis of the laser 8, and an optical converter 10. The main receiving channel 15 of the receiving section 6 of the apparatus comprises a photodetector 16 and a measuring unit 17 (FIG. 14) which is analogous to the measuring unit 20 of the additional receiving channel 18 and is a phasemeter with a phase measuring range of $0-2\pi$ radians.

Figure 16:
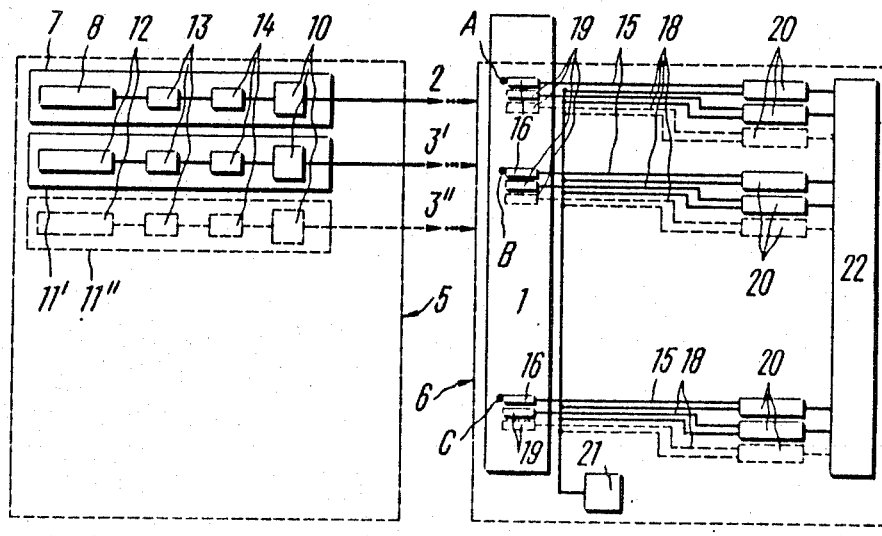
FIG. 16 illustrates a skeleton diagram of an apparatus for sensing spatial coordinates of several points of an article, according to the invention.

In order to sense spatial coordinates of several points of an article, the receiving section 6 of the apparatus (FIG. 16) comprises, for each point of the article 1, for example, for points A, B and C, photodetectors 16 and 19 of respective main receiving channel 15 and additional receiving channels 18. Each photodetector is connected to a respective measuring unit 20 and to the reference signal transmitter 21.

The apparatus operates exactly as described above.

In case fast response of the apparatus for sensing spatial coordinates of an article point is not required, an optical channel switch 28 is inserted in the transmitting section 5 of the apparatus (FIG. 17) at the output of all transmitting optical channels.

In this case the receiving section 6 of the apparatus is equipped with only one main receiving channel 15 comprising a photodetector 29 optically aligned with the point A of the article 1 and a measuring unit 20 connected to the photodetector 29. The measuring unit 20 is a phasemeter with a phase measuring range of $0-2\pi$ radians. No receiving channel switch 30 (FIG. 13) is necessary in this case.

Figure 17:
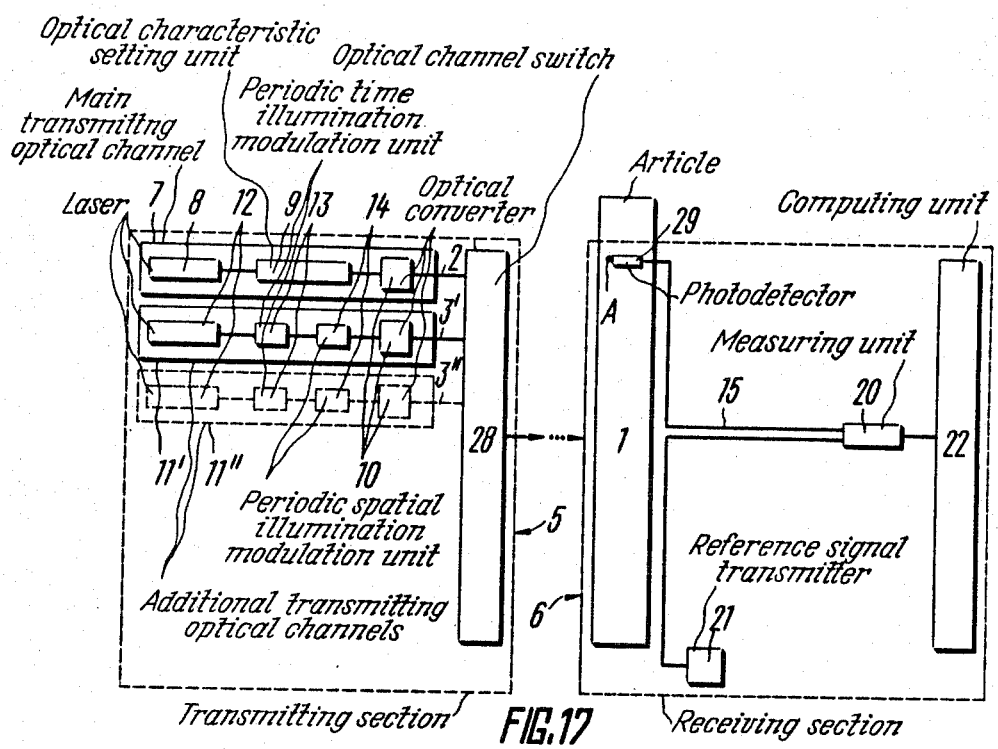
FIG. 17 illustrates a skeleton diagram of an apparatus for sensing a spatial coordinate of a selected point of an article, featuring an optical channel switch, according to the invention.

The apparatus of FIG. 17 operates in the manner described above: the optical channel switch 28 turns on in succession the main transmitting channel 7 and additional transmitting channels 11. In the main receiving channel 15 the phases of each of the coherent light fields 2,3',3" at the point A of the article 1 are measured synchronously. The resulting data are fed to the computer 22.

Figure 18:
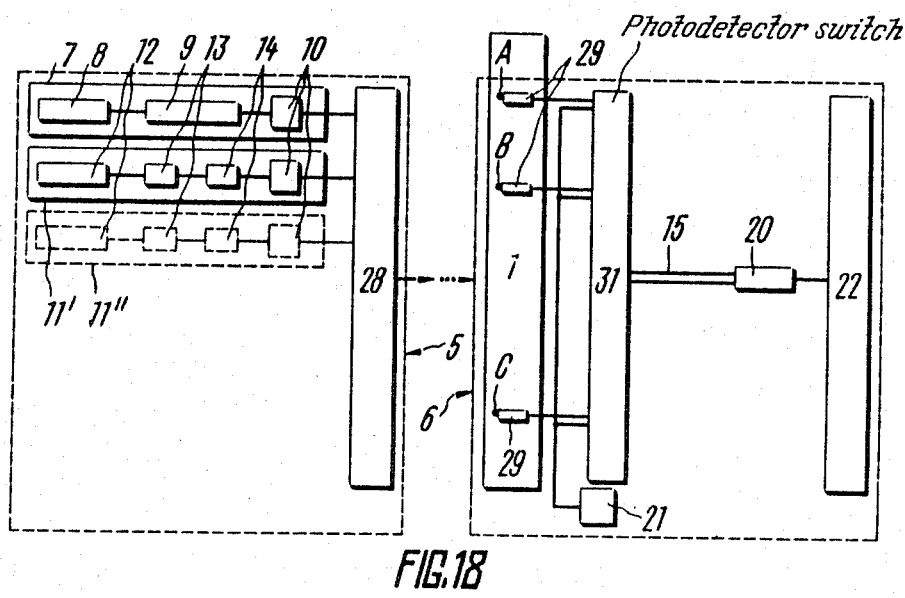
FIG. 18 illustrates a skeleton diagram of an apparatus for sensing spatial coordinates of several points of an article, featuring an optical channel switch and a photodetector switch, according to the invention.

In order to sense coordinates of several points, for example points A,B,C, the apparatus shown in FIG. 17 comprises an optical channel switch 28 in the transmitting section 5, whereas the receiving section 6 has only the main receiving channel 15, is provided in the receiving section 6 with a photodetector 29 (FIG. 18) for each point A,B and C of the article 1. Each photodetector 29 is optically aligned with a respective point (A,B or C) of the article 1. Also inserted in the receiving section 6 is a photodetector switch 31 whose inputs are connected to said photodetectors 29 and the reference signal transmitter 21, the output thereof being connected to the measuring unit 20.

The apparatus operates as described above, considering the absence of the receiving channel switch 30. The photodetector switch 31 connects successively the measuring unit 20 to each photodetector 29. With each connection the optical channel switch 28, in turn, successively switches all transmitting channels 7 and 11. The resulting data are fed to the coordinate computing unit 22 which controls the operation of the optical channel switch 28 and the photodetector switch 31.

Another embodiment of the apparatus is used to investigate processes wherein continuous variations of coordinates of selected points from some initial quantities takes place, for example, when the article moves, or vibrates, or is deformed. The transmitting section of the apparatus comprises only the main transmitting channel 7 (FIG. 19) equipped with a laser 8, a periodic time illumination modulation unit 13, a spatial periodic illumination modulation unit 14, and an optical converter 10. The receiving section 6 has a photodetector 29 optically aligned with the point A of the article 1, a periodic reticle array 32 positioned immediately before the photodetector 29 (FIG. 19'), a reference signal transmitter 21 and a measuring unit 20 which is an electronic phasemeter with a widened phase measuring range of $0-2\pi N$ radians (N=1,2,3 . . . ). The periodic reticle array 32 placed in front of the photodetector 29 is designed for spatial filtering of the optical signal coming to the photocathode of the photodetector and permits substantial increase of the signal-to-noise ratio in the electrical signal at the input of the electronic phasemeter. Optimal spatial matched filtering is achieved by selecting the period of the array 32 equal to the period of the spatial periodic modulation of illumination in the main coherent light field, and also by aiming the array 32 in the direction of measurement. The electronic phasemeter with a wide phase measuring range of $0-2\pi N$ radians (N=1,2,3 . . . ) can count down integers and measure fractions of periods of the spatial periodic modulation of illumination of the main coherent light field, which passed through the point A of the article 1 as it moved continuously.

The reference signal transmitter 21 can, for example, be, as described above, a sinusoidal voltage generator (not shown in FIG. 19) supplying the periodic time illumination modulation unit 13 which is an optical frequency modulator 27.

The apparatus operates as follows.

As the article 1 moves, the point A of said article 1 (FIG. 19) crosses the main coherent light field 2 with periodic spatial modulation of illumination, which is a set of planes 33 equally illuminated and arranged in space parallel to one another with a period $\Lambda$.

The task is to continuously measure the number of integer parts $n(x_o)$ and fractional parts $\Delta\phi(x_o)/2\pi$ of periods of spatial modulation of illumination, which pass through the point A as it moves to a quantity $x_o$. In order to step up the accuracy of measurements and to realize the countdown, the illumination of the main coherent light field is, as described above, modulated in time by means of an optical frequency modulator 27 which makes equally illuminated planes 33 continuously travel in space at a constant velocity in the direction of measurement. The photodetector 29 optically aligned with the point A of the article 1 produces an alternating electrical signal whose phase is a function of the travel x of the point A of the article 1. The electrical signal from the output of the photodetector 29 is supplied together with the reference signal of the reference signal transmitter 21 to the input of the phasemeter 20 with a wide phase measuring range of $0-2\pi N$ radians (N=1,2,3 . . . ). The measured magnitude of the phase $\phi(x_o)=2\pi n(x_o)+\Delta\phi(x_o)$ is fed to the coordinate computing unit 22 which calculates the coordinate x of the point A of the article.

In case sensing of movement of several points is required, for example, points A, B and C of the article 1, the receiving section 6 of the apparatus is equipped with one photodetector 29 (FIG. 20) for each of selected points A, B and C of the article 1, as well as one periodic array 32 for each point to be placed in front of each photodetector 29 (FIG. 20'). The period of the array 32 coincides with the period of spatial periodic modulation of illumination of the main coherent light field. The output of each photodetector 29 and the output of the reference signal transmitter 21 are connected to the input of a respective electronic phasemeter with a wide phase measuring range of $0-2\pi N$ radians (N=1,2,3, . . . ). The outputs of the phasemeter 20 are connected to the coordinate computing unit 22. The reference signal transmitter can be made as described above.

In order to determine the position of a movable component 34 (FIG. 21) of a coordinate mechanism, for example, in microelectronic systems, the main transmitting optical channel 7 of the transmitting section of the apparatus comprises, mounted on the stationary foundation 35 of the coordinate mechanism, a laser 8 on whose optical axis are arranged an optical frequency modulator 27 which shifts the frequency of laser radiation, a beam splitter 23, an optical converter 10, and two periodic arrays 36 and 37 with different periods $\lambda_1$ and $\lambda_2$, which are placed on the movable element 34 of the coordinate mechanism normally to the optical axis of the laser 8 and are aimed in the direction of movement of the element 34.

The periodic arrays 36 and 37 are made so that the number of periods of the array 37 exceeds by one the number of periods of the array 36 in the range wherein the position of the movable element 34 is determined.

The optical converter 10 is designed to produce the main coherent light field of a suitable size in the area of the movable element 34.

The main receiving channel 15 comprises photodetectors 16 mounted on the stationary foundation 35 of the coordinate mechanism behind each periodic array 36 and 37 and connected to the measuring unit 20. This measuring unit 20 is a phasemeter with a phase measuring range of $0-2\pi$ radians.

The output of the photodetector 16' positioned after the array 36 having less periods is connected to a measuring input 38 of the phasemeter 20, whereas the output of the photodetector 16" positioned after the array 37 having more periods is connected to a reference input 39 of the phasemeter 20.

In this embodiment of the apparatus the main coherent light field is produced by two coherent light fields formed by the beam splitter 23, the optical converter 10 and the arrays 36 and 37, respectively. The optical characteristic of the main coherent light field, realizing one-to-one correspondence between magnitudes of said optical characteristic in the point of the field coinciding with the selected point on the movable element 34 and the coordinate of the selected point, is the difference in phases between said two coherent light fields in the selected point. The maximum difference in phases ($2\pi$) is achieved only when the movable element 34 is in one of its extreme positions.

If spatial frequencies of the array 36 and the beam splitter 23 coincide, the electrical signal $i_1(t)$ at the output of the photodetector 16' positioned after this array is equal to:

$$i_1(t) = i_{01}\left[1 + \cos\left(\Omega t + \frac{x_o}{\lambda_1}\right)\right], \quad (13)$$

where:
  $i_{01}$—maximum values of the electrical signal;
  $\Omega$-frequency of time modulation of illumination, produced by the optical frequency modulator 27;
  $\lambda_1$—period of the array 36;
  $x_o$—unknown coordinate of the movable element 34.

The electrical signal $i_2(t)$ at the output of another photodetector 16" positioned after the array 37 is equal to:

$$i_2(t) = i_{02}\left[1 + \cos\left(\Omega + \frac{x_o}{\lambda_2}\right)\right], \quad (14)$$

where:
  $\lambda_2$—period of the array 37;
  $i_{02}$—maximum value of the electrical signal.

The electrical signals $i_1(t)$ and $i_2(t)$ are delivered to the measuring input 38 and the reference input 39, respectively, of the phasemeter 20 with the phase measuring range of $0-2\pi$ radians. The phasemeter 20 measures the phase difference $\Delta\phi<2\pi$ between said electrical signals which is equal to:

$$\Delta\phi = 2\pi \left( \frac{X_0}{\lambda_2} - \frac{X_0}{\lambda_1} \right) = 2\pi X_0 \frac{\lambda_1 - \lambda_2}{\lambda_1 \cdot \lambda_2} \quad (15)$$

The quantity $$\frac{\lambda_1 \cdot \lambda_2}{\lambda_1 - \lambda_2} = \Lambda_1$$

is the period of spatial modulation of illumination of the main coherent light field. Since by definition $\lambda_1 = X/N_1$; where X—range of measurement of position of the movable element 34;

$N_1$—number of periods in the array 36 in the range X, and $\lambda_2 = X/(N_1+1)$, the period $\lambda_1$ of spatial modulation of illumination of the main coherent light field is equal to:

$$\Lambda_1 = \frac{\lambda_1 \cdot \lambda_2}{\lambda_1 - \lambda_2} = X \quad (16)$$

In this manner, measuring by the phasemeter 20 the phase difference $\Delta\phi \leq 2\pi$ between electrical signals of the photodetectors 16, and knowing the period of spatial modulation of illumination of the main coherent light field, equal to the range X of the measurement of the position of the movable element 34, the unknown position $x_o$ of the movable element 34 can be obtained $$x_o = \Lambda_1 \cdot (\Delta\phi/2\pi) \quad (17)$$

In case the determined position $x_o$ of the movable element 34 is not sufficiently accurate, according to the proposed method, at least one additional coherent light field with periodic spatial and time modulation of illumination should be formed in order to determine coordinates of a point of an article. To this end, the transmitting section of the above described apparatus for determining the position of the movable element 34 of the coordinate mechanism (FIG. 22) should comprise a first additional optical channel. The receiving section 6 should comprise a first additional receiving channel. The first additional transmitting optical channel 11 uses a laser 8, units 13 and 14 for time and spatial modulation of illumination, an optical converter 10, a periodic array 37 of the main transmitting optical channel, and comprises a periodic array 40 mounted, like the periodic array 37, on the movable element 34 of the coordinate mechanism normally to the optical axis of the laser 8 and aimed in the direction of movement of the movable element 34. The array 40 is made so that the number of periods thereof in the measurement range exceeds by a whole number of periods the number of periods of the array 37. The first additional receiving channel uses the photodetector 16" of the main receiving channel, mounted after the periodic array 37, and comprises a photodetector 19' also mounted on the stationary foundation 35 after the periodic array 40. In addition to the photodetector 19' the first additional receiving channel comprises a measuring unit 20 which is a phasemeter with a phase measuring range of 0–2π radians. The output of the photodetector 16" positioned after the periodic array 37 is also connected to the measuring input 38 of said phasemeter 20, whereas the reference input thereof is connected to the output of the photodetector 19' of the first additional receiving channel.

In this embodiment of the apparatus the first additional coherent light field 31 is produced by two coherent light fields formed by the beam splitter 23, the optical converter 10 and the arrays 37 and 40, respectively.

The periodic spatial modulation of illumination of the first additional coherent light field 3 (FIG. 7) is produced as a phase difference between said coherent light fields.

This is achieved as follows.

The electrical signal $i_3(t)$ at the output of the photodetector 19' positioned after the periodic array 40 is equal to:

$$i_3(t) = i_{30}\left[ 1 + \cos\left( \Omega t + \frac{x_1}{\lambda_3} \right) \right], \quad (18)$$

where:

$\lambda_3$—period of the array 40;

$i_{30}$—maximum electrical signal;

$x_1$—more accurate magnitude of the coordinate of the movable element 34.

The complete phase difference $\Delta\Phi_2$ between the electrical signal $i_3(t)$ and the electrical signal $i_2(t)$ (14) is equal to:

$$\Delta\phi_2 = 2\pi \left( \frac{X_1}{\lambda_3} - \frac{X_1}{\lambda_2} \right) = 2\pi X_1 \frac{\lambda_2 - \lambda_3}{\lambda_2 \cdot \lambda_3} \quad (19)$$

The quantity $$\frac{\lambda_2 \cdot \lambda_3}{\lambda_2 - \lambda_3} = \Lambda_2$$

is the period of spatial modulation of illumination of the first additional coherent light field 3'. Since by definition $\lambda_2 = X/(N_1+1)$, where $N_1+1$ is the number of periods of the array 37 in the range X, and $\lambda_3 = X/(N_1+1+n_1)$, where $N_1+1+n_1$ is the number of periods of the array 40 in the range X, and $n_1$ is a whole number, the period $\Lambda_2$ of the spatial periodic modulation of illumination is equal to:

$$\Lambda_2 = \frac{\lambda_2 \cdot \lambda_3}{\lambda_2 - \lambda_3} = \frac{X}{n_1} \quad (20)$$

It follows that $n_1$ is the number of periods of spatial modulation of illumination of the first additional coherent light field 3', which can fit into the range X.

The complete phase difference $\Delta\Phi_2$ in this position $x_1$ of the movable element 34 is thus equal to:

$$\Delta\Phi_2 = 2\pi(X_1/\Lambda_1) \quad (21)$$

On the other hand, the complete phase difference $\Delta\Phi_2$ can be expressed as:

$$\Delta\Phi_2 = 2\pi m_1 + \Delta\phi_2, \quad (22)$$

where:

$m_1$—whole number of periods $2\pi$;

$\Delta\phi_2/2\pi$—fraction of the period $2\pi$.

It follows from the expression (21) and (22) that:

$$m_1+(\Delta\phi_2/2\pi)=X_1/\Lambda_2 \quad (23)$$

Consequently, $m_1$ is the whole number of periods of spatial modulation of illumination of the first additional coherent light field 3', which can fit into the interval $x_1$, that is $m_1+1$ is, the number of the period of spatial modulation of illumination of the first additional coherent light field 3' wherein the selected point of the movable element 34 occurs at the moment of measurement. This number, as mentioned above, according to the invention can be found by means of formulae (8 and 10).

The fraction $\Delta\phi_2/2\pi$ is measured by the phasemeter 20 of the first additional receiving channel 18'. For this, as described above, the electrical signal $i_3(t)$ is supplied to the reference input 39 of the phasemeter 20 of the first additional receiving channel 18', and the electrical signal $i_2(t)$ is supplied to the measuring input 38 thereof.

Figure 23:
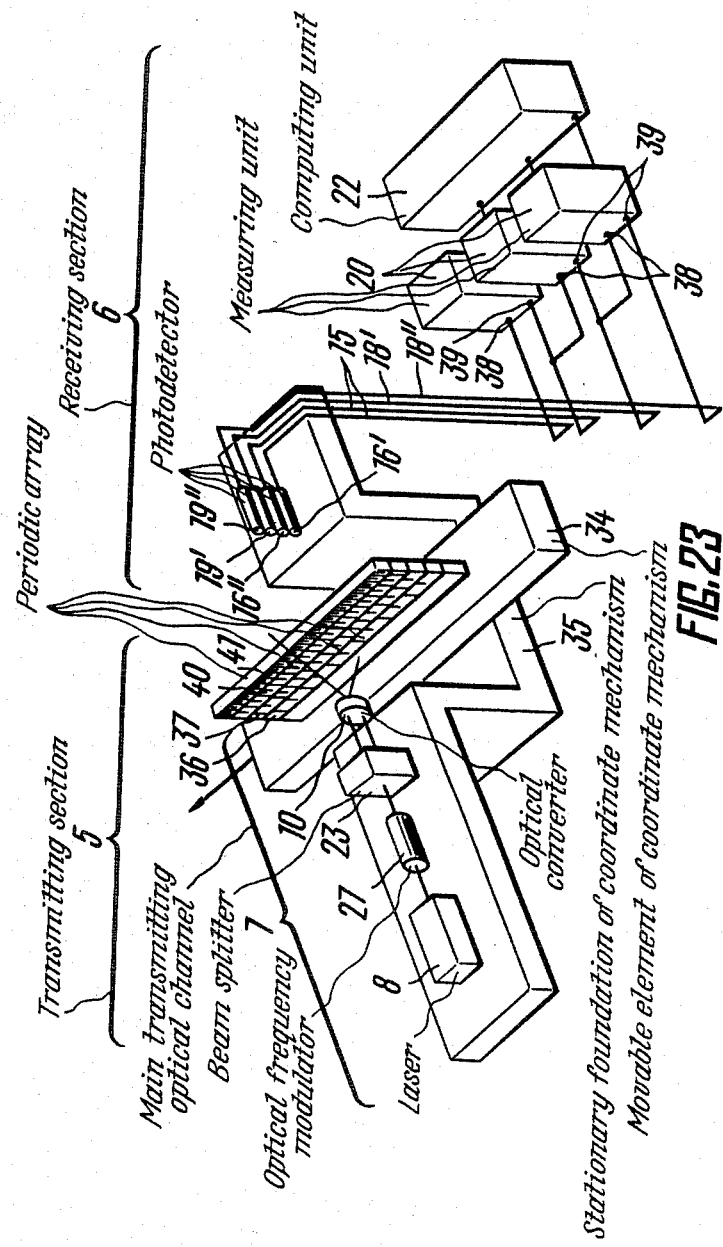
FIG. 23 illustrates schematically an apparatus for sensing the position of a movable element of a coordinate mechanism, showing two additional transmitting optical channels and two additional receiving channels, according to the invention.

In case the more accurate value $x_1$ of the position of the movable element 34 is still insufficiently accurate, according to the invention a second additional coherent light field 3" (FIG. 7) should be formed with periodic spatial and time modulation of illumination. For this purpose, the above apparatus is equipped with a second additional transmitting optical channel and a second additional receiving channel 18". The second additional transmitting optical channel uses (FIG. 23) a laser 8, units 13 and 14 of time and spatial modulation of illumination, an optical converter 10 of the main transmitting optical channel 7, a periodic array 40 of the first additional optical transmitting channel, and comprises a periodic array 41 placed, as the periodic arrays 36, 37 and 40, on the movable element 34 of the coordinate mechanism normally to the optical axis of the laser 8 and aimed in the direction of movement of said element 34. The array 41 is made so that the number of the periods thereof in the measuring range exceeds by one whole number the number of periods of the array 40.

The second additional receiving channel 18" uses the photodetector 29 of the first additional receiving channel 18', and comprises a photodetector 19" mounted on the stationary foundation 35 of the coordination mechanism after the periodic array 41, and a measuring unit 20 which is a phasemeter with a phase measuring range of $0-2\pi$ radians. The output of the photodetector 19' of the first additional receiving channel 18' is connected also to the measuring input 38 of the phasemeter 20 of the second additional receiving channel. The reference input 39 of said phasemeter 20 is connected to the output of said photodetector 19" of the second receiving channel 18.

In this embodiment of the apparatus the second additional coherent light field is produced on the basis of the same principle as the first additional coherent light field, namely by two coherent light fields formed by the beam splitter 23, the optical converter 10 and the arrays 40 and 41, respectively.

The proposed method for sensing a spatial coordinate of a point of an article permits, for the first time, determination of coordinates of points of an article, either stationary or mobile with respect to the optical system, with high accuracy and over a wide measuring range. This method provides for creating a novel class of precision laser measuring devices for sensing the shape and position of an article in space, including apparatus for sensing the state of a deformed moving article. Moreover, the disclosed method for sensing a spatial coordinate of an article point and an apparatus therefor permit precision strain gauging and measuring of characteristics of gaseous and liquid mediums.

What is claimed is:

1. A method for sensing a spatial coordinate of a point of an article, comprising the following steps:

selecting a point on said article, whose coordinate is to be found;

producing a main coherent light field having several optical characteristics, one of which ensures one-to-one correspondence between the magnitude of said optical characteristics at any point in said field and the coordinate of said point at least along one coordinate axis;

selecting a desired optical characteristic of said field;

transmitting said coherent light field to said point on said article;

measuring the magnitude of the selected optical characteristic of said main coherent light field at the point coinciding with the selected point on said article;

determining an approximate coordinate of the selected point on the article by using the obtained magnitude of said optical characteristic of said main coherent light field, thereby taking advantage of the one-to-one correspondence between the magnitude of said optical characteristic at any point in said field and the coordinate of said point;

producing at least one additional coherent light field which has no interaction with said main coherent light field and that possesses spatial periodic modulation of the illumination thereof;

transmitting said additional coherent light field to said article;

measuring the phase value of said additional coherent light field within a range of $2\pi$ radians at the point coinciding with the selected point on said article;

finding the number of the period of the spatial periodic modulation of illumination of said additional coherent light field, wherein the selected point on said article occurs at the moment of measurement, and, for this purpose, at first calculating the ratio of said approximate coordinate of the selected point on said article to the period of spatial modulation of illumination of the additional coherent light field;

subtracting said phase value expressed in radians from said ratio, the number of the period of spatial periodic modulation of illumination of said additional coherent light field being the integer of the quantity obtained by said subtraction;

determining a more accurate coordinate of the selected point of said article by adding up all the periods of spatial periodic modulation of illumination of said additional coherent light field up to the period having said found number, wherein the selected point of said article occurs at the moment of measurement, and said phase value is expressed in radians.

2. The method as claimed in claim 1, wherein said period of spatial periodic modulation of illumination of the additional coherent light field is selected to exceed a double maximum error of measurement of the coordinate of the selected point of said article, which is found by said magnitude of the optical characteristic of the main coherent light field.

3. The method as claimed in claim 1, wherein the number of said additional coherent light fields is increased for increased accuracy of measuring the coordinate of the selected point of said article, each of said additional coherent light fields having no interaction with one another and with said main coherent light field.

4. A method for sensing a spatial coordinate of a point of an article, comprising:
   selecting a point on said article, whose coordinate is to be found;
   producing a main coherent field having several optical characteristics, one of which ensures one-to-one correspondence between the magnitude of said optical characteristic at any point in said field and the coordinate of said point at least along one coordinate axis;
   selecting a desired optical characteristic of said field;
   transmitting said coherent light field to said point on said article;
   measuring the magnitude of the selected optical characteristic of said main coherent light field at the point coinciding with the selected point on said article;
   determining an approximate coordinate of the selected point on the article by using the obtained magnitude of said optical characteristic of said main coherent light field, thereby taking advantage of the one-to-one correspondence between the magnitude of said optical characteristic at any point;
   producing a first additional coherent light field which has no interaction with said main coherent light field and that possesses spatial periodic modulation of the illumination thereof;
   measuring the phase value of said first additional coherent light field within the range of $2\pi$ radian at the point coinciding with the selected point on said article;
   finding the number of the period of the spatial periodic modulation of illumination of said first additional coherent light field, wherein the selected point on said article occurs at the moment of measurement, and, for this purpose, at first, calculating the ratio of said coordinate of the selected point on said article to the period of spatial modulation of illumination of said first additional coherent light field;
   subtracting from said ratio said phase value expressed in radians, the number of the period of spatial periodic modulation of illumination of the first additional coherent light field being the integer of the quantity obtained by said subtraction;
   determining a more accurate coordinate of the selected point of said article by summing all the periods of spatial periodic modulation of illumination of said first additional coherent light field up to the period having said found number, wherein the selected point of said article occurs at the moment of measurement, and said phase value is expressed in radians;
   producing a second additional coherent light field which has no interaction with said main coherent light field and said first additional coherent light field and possesses spatial periodic modulation of illumination;
   transmitting said second additional coherent light field to said article;
   measuring the phase value of said second additional coherent light field within the range of $2\pi$ radians at the point coinciding with the selected point on said article;
   finding the number of the period if the spatial periodic modulation of illumination of said second additional coherent light field, wherein the selected point on said article occurs at the moment of measurement, and, for this purpose, at first, calculating the ratio of said coordinate of the selected point on the article, made more accurate with the help of said first additional coherent light field, to the period of spatial modulation of said second additional coherent light field;
   subtracting from said ratio said phase value expressed in radians, the number of the period of spatial periodic modulation of illumination of said second additional coherent light field being the integer of the quantity obtained by said subtraction;
   determining a next more accurate coordinate of the selected point of said article by summing all the periods of spatial periodic modulation of illumination of said second additional coherent light field up to the period having said found number, wherein the selected point of said article occurs at the moment of measurement, and said phase value is expressed in radians.

5. The method as claimed in claim 4, wherein the period of spatial periodic modulation of illumination of each additional coherent light field is less than the period of spatial periodic modulation of illumination of the preceding additional coherent light field.

6. An apparatus for sensing a spatial coordinate of a point on an article, comprising:
   a transmitting section including:
      a main transmitting optical channel having:
         a laser for producing a main coherent light field and having an optical axis;
         means for setting a predetermined optical characteristic for ensuring one-to-one correspondence between the magnitude of said optical characteristic at any point in said main coherent light field and a coordinate of said point on said article at least along one coordinate axis positioned on the optical axis of said laser;
         an optical converter for producing in the area of said article said main coherent light field of a suitable size and positioned on the optical axis of said laser;
      at least one additional transmitting optical channel comprising:
         an additional laser for producing an additional coherent light field and having an optical axis;
         means for periodic spatial modulation of the illumination of said additional coherent light field and positioned on the optical axis of said additional laser;
      means for periodic time modulation of the illumination of said additional coherent light field positioned on the optical axis of said additional laser;
      an optical converter for producing in the area of said article said additional coherent light field of suitable size and positioned on the optical axis of said additional laser;
   a receiving section including: a main receiving channel having:
      a photodetector optically aligned with said point on said article;
      measuring means connected to said photodetector;
   at least one additional receiving channel having:
      an additional photodetector optically aligned with said point of said article;

measuring means connected to said additional photodetector;

a reference signal transmitter connected to said measuring means of said main and said additional receiving channels; and computing means for computing coordinates, said computing means connected to said measuring means of said main and additional receiving channels.

7. The apparatus as claimed in claim 6, comprising a plurality of additional transmitting channels and a plurality of respective additional receiving channels, each additional transmitting and additional receiving channel serving to increase the accuracy of the preceding measurement of the coordinate.

8. The apparatus as claimed in claim 6, comprising:
a transmitting section including:
a main transmitting optical channel having:
a laser for producing a main coherent light field and having an optical axis;
an optical converter for producing in the area of said article said main coherent light field of a
suitable size and positioned on the optical axis of said laser;
optical characteristic setting means for ensuring one-to-one correspondence between the magnitude of a predetermined optical characteristic at any point in said main coherent light field and the coordinate of said point on said article at least along one coordinate axis positioned on the optical axis of said laser, said setting means including:
periodic time illumination modulation means positioned on the optical axis of said laser;
periodic spatial illumination modulation means positioned on the optical axis of said laser;
at least one additional transmitting optical channel having:
an additional laser for producing an additional coherent light field and having an optical axis;
means for periodic spatial modulation of the illumination of said additional coherent light field and positioned on the optical axis of said additional laser;
periodic time illumination modulation means for modulating said additional coherent light field and positioned on the optical axis of said additional laser;
an optical converter for producing in the area of said article said additional coherent light field of a suitable size and positioned on the optical axis of said additional laser;
a receiving section including:
a main receiving channel having:
a photodetector optically aligned with said point on the article;
measuring means including a phasemeter having a phase measuring range of $0-2\pi$ radians and connected to said photodetector;
at least one additional receiving channel having:
an additional photodetector optically aligned with said point of the article;
measuring means including a phasemeter having a phase measuring range of $0-2\pi$ radians and connected to said additional photodetector;
a reference signal transmitter connected to said measuring means of said main and additional receiving channels;
coordinate computing means connected to said measuring means of said main and additional receiving channels.

9. An apparatus for sensing spatial coordinates of several points on an article, comprising:
a transmitting section including;
a main transmitting optical channel having:
a laser for producing a main coherent light field having an optical axis;
means for setting a predetermined optical characteristic for ensuring one-to-one correspondence between the magnitude of said optical characteristic at any point in the main coherent light field and the coordinate of a point on said article at least along one coordinate axis positioned on the optical axis of said laser;
an optical converter for producing in the area of said article said main coherent light field of a suitable size and positioned on the optical axis of said laser;
at least one additional transmitting optical channel having:
an additional laser for producing an additional coherent light field and having an optical axis;
means for periodic spatial modulation of the illumination of said additional coherent light field and positioned on the optical axis of said additional laser;
means for periodic time modulation of the illumination of said additional coherent light field positioned on the optical axis of said additional laser;
an optical converter for producing in the area of said article said additional coherent light field of a suitable size and positioned on the optical axis of said additional laser;
a receiving section including:
a main receiving channel for sensing a coordinate of a first point of the article, having:
a photodetector optically aligned with said first point of said article;
measuring means connected to said photodetector;
at least one additional receiving channel for sensing a coordinate of said first point on said article, having:
a photodetector optically aligned with said first point of said article;
measuring means connected to said photodetector;
a main receiving channel for sensing a coordinate of said a second point on the article, having:
a photodetector optically aligned with said second point on the article;
measuring means connected to said photodetector;
at least one additional receiving channel for said second point of the article, having;
a photodetector optically aligned with said second point of said article;
measuring means connected to said photodetector;
a reference signal transmitter connected to said measuring means of said main receiving channels and to said measuring means of said additional receiving channels;
coordinate computing means connected to said measuring means of said main receiving channels and said additional receiving channels.

10. An apparatus for sensing a spatial coordinate of a point on an article, comprising:
a transmitting section including;
a main transmitting optical channel having:
a laser for producing a main coherent light field having an optical axis;

means for setting a predetermined optical characteristic for ensuring one-to-one correspondence between the magnitude of said optical characteristic at any point in said main coherent light field and the coordinate of said point on said article at least along one coordinate axis positioned on the optical axis of said laser;

an optical converter for producing in the area of said article said main coherent light field of a suitable size and positioned on the optical axis of said laser;

at least one additional transmitting optical channel having:

an additional laser for producing an additional coherent light field and having an optical axis;

means for periodic spatial modulation of the illumination of said additional coherent light field and positioned on the optical axis of said additional laser;

means for periodic time modulation of the illumination intensity of said additional coherent light field and positioned on the optical axis of said additional laser;

an optical converter for producing in the area of said article said additional coherent light field of a suitable size and positioned on the optical axis of said additional laser;

an optical channel switch having a plurality of inputs, the number of which inputs is equal to the number of said main and additional transmitting optical channels, said switch connected to each of said channels and having one output;

a receiving section including;

a main receiving channel having;

a photodetector optically aligned with said point on said article;

at least one additional receiving channel including said photodetector of said main receiving channel;

a receiving channel switch having one input and two outputs, said input being connected to said photodetector;

measuring means in the main receiving channel and connected to one output of said receiving channel switch;

measuring means in the additional receiving channel and connected to another output of said receiving channel switch;

a reference signal transmitter whose output is connected to the input of said receiving channel switch;

coordinate computing means connected to said measuring means of said main and additional receiving channels.

11. An apparatus for sensing spatial coordinates of several points an article, comprising:

a transmitting section including:

a main transmitting optical channel having:

a laser for producing a main coherent light field and having an optical axis;

optical characteristic setting means for ensuring one-to-one correspondence between the magnitude of a predetermined optical characteristic at any point of said main coherent light field and the coordinate of a point on said article at least along one coordinate axis positioned on the optical axis of said laser;

an optical converter for producing in the area of said article said main coherent light field of a suitable size and positioned on the optical axis of said laser;

at least one additional transmitting optical channel having:

an additional laser for producing an additional coherent light field and having an optical axis;

means for periodic spatial modulation of the illumination of said additional coherent light field positioned on the optical axis of said additional laser;

means for periodic time modulation of the illumination of said additional coherent light field positioned on the optical axis of said additional laser;

an optical converter for producing in the area of said article said additional coherent light field of a suitable size and positioned on the optical axis of said additional laser;

an optical channel switch having a plurality of inputs equal in number to the number of said main and additional optical channels to which said inputs are connected, said switch having one output;

a receiving section including:

a main receiving channel for sensing the coordinate of a first point on the article, having:

a photodetector optically aligned with said first point on the article;

at least one additional receiving channel for said first point on the article, and including said photodetector of said main receiving channel;

a main receiving channel for sensing a coordinate of a second point on the article, having:

a photodetector optically aligned with said second point on the article;

at least one additional receiving channel for said second point on the article, and including said photodetector of said main receiving channel for said second point on said article;

a photodetector switch connected to each of said photodetectors optically aligned with said first point and said second point of the article, respectively, and having a plurality of inputs equal in number to the number of photodetectors connected thereto, and having one output;

a receiving channel switch having one input and two outputs, said input being connected to said output of said photodetector switch;

measuring means in each of said main receiving channels and connected to one of said outputs of said receiving channel switch;

measuring means in each of said additional receiving channels and connected to the other output of said receiving channel switch;

a reference signal transmitter having an output connected to said inputs of said photodetector switch;

coordinate computing means connected to said measuring means of said main and additional receiving channels.

12. The apparatus as claimed in claim 11 for sensing spatial coordinates of several points on the article, comprising:

a transmitting section including:

a main transmitting optical channel having:

a laser for producing a coherent light field and having an optical axis;

periodic time illumination modulation means positioned on the optical axis of said laser;

periodic spatial illumination modulation means positioned on the optical axis of said laser;

an optical converter for producing in the area of said article said main coherent light field of a suitable size and positioned on the optical axis of said laser;

a receiving section including:

a main receiving channel for sensing a coordinate of a first predetermined point on the article, which channel has:

a photodetector optically aligned with said first point on the article;

a periodic array positioned between said photodetector and said transmitting section and secured rigidly to said photodetector and oriented in the measuring direction, the period of said array coinciding with the period of spatial modulation of illumination of said main coherent light field;

measuring means connected to said photodetector and including a phasemeter with a phase measuring range of 0 to $2\pi N$ radians, where $N = 1, 2, 3, \ldots$;

a main receiving channel for sensing a coordinate of a second predetermined point on the article having:

a second photodetector optically aligned with said second point on the article;

a periodic array positioned between said second photodetector and said transmitting section and rigidly secured to said photodetector and oriented in the measuring direction, the period of said array coinciding with the period of spatial modulation of illumination of said main coherent light field;

measuring means connected to said photodetector and including a phasemeter with a phase measuring range of 0 to $2\pi N$ radians, where $N = 1, 2, 3 \ldots$;

a reference signal transmitter connected to said measuring units of said main receiving channels and to said measuring units of said additional receiving channels;

coordinate computing means connected to said measuring units of said main receiving channels and to said measuring units of said additional receiving channels.

13. An apparatus for sensing spatial coordinates of several points on an article, comprising:

a transmitting section including:

a main transmitting optical channel having:

a laser for producing a main coherent light field and having an optical axis;

an optical converter for producing in the area of the article said main coherent light field of a suitable size and positioned on the optical axis of said laser;

means for setting a predetermined optical characteristic for ensuring one-to-one correspondence between the magnitude of a predetermined optical characteristic at any point in the main coherent light field and the coordinate of a point on said article at least along one coordinate axis positioned on the optical axis of said laser, said setting means including:

periodic time illumination modulation means positioned on the optical axis of said laser;

periodic spatial illumination modulation means positioned on the optical axis of said laser;

at least one additional transmitting optical channel having:

an additional laser for producing an additional coherent light field and having an optical axis means for periodic spatial illumination modulation of said additional coherent light field and positioned on the optical axis of said additional laser;

periodic time illumination modulation means for modulating said additional coherent light field and positioned on the optical axis of said additional laser;

an optical converter for producing in the area of the article said additional coherent light field of a suitable size and positioned on the optical axis of said additional laser;

a receiving section including a main receiving channel for sensing the coordinate of a first predetermined point on the article, said channel having:

a photodetector optically aligned with said first point of the article;

measuring means including a phasemeter having a phase measuring range of $0 - 2\pi$ radians and connected to said photodetector;

at least one additional receiving channel for sensing the coordinate of the first point on the article, said additional channel having:

an additional photodetector optically aligned with said first point of the article;

measuring means including a phasemeter having a phase measuring range of $0 - 2\pi$ radians and connected to said additional photodetector;

a main receiving channel for sensing a coordinate of a second predetermined point on the article, having:

a photodetector optically aligned with said second point on the article;

measuring means including a phasemeter having a phase measuring range of $0 - 2\pi$ radians and connected to said photodetector;

at least one additional receiving channel for sensing the coordinate of the second point of the article, having:

an additional photodetector optically aligned with said second point on said article;

measuring means including a phasemeter having a phase measuring range of $0 - 2\pi$ radians and connected to said additional photodetector;

a reference signal transmitter connected to said measuring means of said main receiving channels and to said measuring means of said additional receiving channels;

coordinate computing means connected to said measuring means of said main receiving channels and to said measuring means of said additional receiving channels.

14. An apparatus for sensing a spatial coordinate of a point on an article, comprising:

a transmitting section including:

a main transmitting optical channel having:

a laser for producing a main coherent light field and having an optical axis;

an optical converter for producing in the area of said article said main coherent light field of a suitable size and positioned on the optical axis of said laser;

means for setting a predetermined optical characteristic for providing one-to-one correspondence between the magnitude of said optical characteristic at any point in said main coherent light field and the coordinate of said point on said article at least along one coordinate axis positioned on the optical axis of said laser, said setting means including:

means for periodic spatial illumination modulation of said main coherent light field and positioned on the optical axis of said laser;

periodic time illumination modulation means for modulating said main coherent light field and positioned on the optical axis of said laser;

at least one additional transmitting optical channel having:

an additional laser for producing an additional coherent light field and having an optical axis;
means for periodic spatial illumination modulation of said additional coherent light field and positioned on the optical axis of said additional laser;
periodic time illumination modulation means for modulating said additional coherent light field and positioned on the optical axis of said additional laser;
an optical converter producing in the area of said article said additional coherent light field of a suitable size and positioned on the optical axis of said additional laser;
an optical channel switch having a plurality of inputs equal in number to the number of said main and additional channels to which said inputs are connected, said switch having one output;
a receiving section including:
a main receiving channel having:
a photodetector optically aligned with said point on said article;
measuring means including a phasemeter with a phase measuring range of $0-2\pi$ radians and connected to said photodetector;
a reference signal transmitter having an output connected to said measuring means;
coordinate computing means connected to said measuring means of said main receiving channel.

15. An apparatus for sensing spatial coordinates of several points on an article, comprising:
a transmitting section including:
a main transmitting optical channel having:
a laser for producing a main coherent light field and having an optical axis;
an optical converter for producing in the area of said article said main coherent light field of a suitable size and positioned on the optical axis of said laser;
means for setting a predetermined optical characteristic for providing one-to-one correspondence between the magnitude of said optical characteristic at any point in said main coherent light field and the coordinate of a point on the article at least along one coordinate axis positioned on the optical axis of said laser, said setting means including:
means for periodic spatial illumination modulation of said main coherent light field and positioned on the optical axis of said laser;
means for periodic time illumination modulation of said main coherent light field and positioned on the optical axis of said laser;
at least one additional transmitting optical channel having:
an additional laser for producing an additional coherent light field and having an optical axis;
means for periodic spatial illumination modulation of said additional coherent light field and positioned on the optical axis of said additional laser;
periodic time illumination modulation means for modulating said additional coherent light field and positioned on the optical axis of said additional laser;
an optical converter for producing in the area of said article said additional coherent light field of a suitable size and positioned on the optical axis of said additional laser;
an optical channel switch having a plurality of inputs equal in number to the number of said main and additional channels to which said inputs are connected, said switch having one output;
a receiving section including:
a main receiving channel for sensing a coordinate of a first point on the article having:
a photodetector optically aligned with said first point on the article;
at least one additional receiving channel for sensing a coordinate of said first point on the article, and including said photodetector of said main receiving channel for sensing a coordinate on the first point of the article;
a main receiving channel for sensing a coordinate of a second point on the article and having:
a photodetector optically aligned with said second point on the article;
at least one additional receiving channel for said second point on the article, and including said photodetector of said main receiving channel for sensing a coordinate of the second point on the article;
a photodetector switch connected to each of said photodetectors, said switch having a plurality of inputs equal in number to the number of photodetectors connected thereto, and having one output;
measuring means including a phasemeter having a phase measuring range of $0-2\pi$ radius and connected to said first and second main and additional channels and connected to said output of said photodetector switch;
a reference signal transmitter having an output connected to one of said inputs of said photodetector switch;
coordinate computing means connected to said measuring unit.

16. An apparatus for sensing changes in the spatial coordinates of a point on an article, comprising:
a transmitting section including:
a main transmitting optical channel;
a laser for producing a main coherent light field and having an optical axis;
means for setting a predetermined optical characteristic for providing one-to-one correspondence between the magnitude of said optical characteristic at any point in said main coherent light field and the coordinate of said point on said article at least along one coordinate axis, and which has:
periodic time illumination modulation means positioned on the optical axis of said laser;
a periodic spatial illumination modulation means positioned on the optical axis of said laser;
an optical converter for producing in the area of said article said main coherent light field of a suitable size and positioned on the optical axis of said laser;
a receiving section including:
a main receiving channel having;
a photodetector optically aligned with said point on the article;
a periodic array positioned between said photodetector and said transmitting section, rigidly secured to said photodetector and oriented in the direction of measurement, and the period of which coincides with the period of spatial modulation of illumination of said main coherent light field;
measuring means connected to said photodetector and including a phasemeter having a phase measuring range of 0 to $2\pi N$ radians, where $N = 1, 2, 3, \ldots$;

a reference signal transmitter connected to said measuring means;
coordinate computing means connected to said measuring means of said main receiving channel.

17. The apparatus as claimed in any of claims 6 to 12, wherein said periodic spatial illumination modulation unit is a beam splitter positioned on the optical axis of said laser.

18. An apparatus for sensing a position of a movable element of a coordinate mechanism having a stationary foundation and a movable element, comprising:
a transmitting section including:
a main transmitting optical channel having:
a laser for producing a coherent light field and having an optical axis;
periodic time illumination modulation means for modulating said main coherent light field and which is positioned on the optical axis of said laser;
means for periodic spatial modulation of the illumination of said main coherent light field, having:
a beam splitter positioned on the optical axis of said laser;
a first periodic array having a predetermined period between the lines of a reticle, positioned on a movable element of said coordinate mechanism normal to the optical axis of said laser and oriented in the direction of movement of said movable element;
a second periodic array having another period between the lines of a reticle, positioned on said movable element of said coordinate mechanism normal to the optical axis of said laser and oriented in the direction of movement of said movable element, the number of periods of said second array in the measuring range exceeding by one the number of periods of the first periodic array in the same measuring range;
an optical converter for producing in the area of the article a coherent light field of a suitable size and positioned on the optical axis of said laser;
a first additional transmitting optical channel including:
said laser included in said main transmitting optical channel;
said optical characteristic setting means included in said main transmitting channel having:
said periodic time illumination modulation means for modulating said main coherent light field included in said main transmitting optical channel and positioned on the optical axis of said laser;
said beam splitter included in said main transmitting channel positioned on the optical axis of said laser;
said optical converter included in said main transmitting channel and positioned on the optical axis of said laser;
said second periodic array included in said main transmitting optical channel and positioned on said movable element of said coordinate mechanism normal to the optical axis of said laser and oriented in the direction of movement of said movable element;
a periodic array positioned on said movable element of said coordinate mechanism normal to the optical axis of said laser in said main channel and oriented in the direction of movement of said movable element, the number of periods of said array in the measuring range exceeding the number of periods of any said array of said main channel by an integer quantity in any measuring range;
a second additional transmitting optical channel including:
said laser included in said main transmitting channel;
said beam splitter included in said main transmitting optical channel and positioned on the optical axis of said laser;
periodic time illumination modulation means for modulating said main coherent light field included in said main transmitting channel and positioned on the optical axis of said laser;
said optical converter included in said main transmitting channel and positioned on the optical axis of said laser;
said periodic array included in said first additional transmitting optical channel and positioned on said movable element of said coordinate mechanism normal to the optical axis of said laser and oriented in the direction of movement of said movable element;
a periodic array positioned on said movable element of said coordinate mechanism normal to the optical axis of said laser of said main channel and oriented in the direction of movement of said movable element, the number of periods of said array in the measuring range exceeding the number of periods of said array of said first additional transmitting channel by an integer quantity;
a receiving section including:
a main receiving channel having:
a first photodetector positioned behind said first periodic array on said stationary foundation of said coordinate mechanism;
a second photodetector positioned behind said second periodic array on said stationary foundation of said coordinate mechanism;
measuring means including a phasemeter with a phase measuring range of 0–2π radians and having a measuring input, and a reference input connected to said first and second photodetectors, the output of said first photodetector located after said first periodic array and connected to an input of said phasemeter, the output of said second photodetector positioned behind said second periodic array and connected to said reference input of said phasemeter;
a first additional receiving channel including:
said second photodetector included in said main receiving channel and positioned behind said second periodic array on said stationary foundation of said coordinate mechanism;
a photodetector positioned behind said periodic array of said first additional transmitting optical channel on said stationary foundation of said coordinate mechanism;
measuring means including a phasemeter with a phase measuring range of 0–2π radians and having measuring and reference inputs, said reference input of said phasemeter being connected to an output of said photodetector of the first additional receiving channel, said measuring input of said phasemeter being connected to an output of said second photodetector included in said main channel;
a second additional receiving channel including:
said photodetector included in the first additional receiving channel and positioned behind said periodic array of said first additional transmitting optical channel on said stationary foundation of said coordinate mechanism;

a photodetector positioned behind said periodic array of said second additional transmitting optical channel on said stationary foundation of said coordinate mechanism;

measuring means including a phasemeter with a phase measuring range of $0$-$2\pi$ radians and having a measuring input and a reference input, said reference input of said phasemeter being connected to the output of the photodetector of the second additional receiving channel and to the output of said photodetector of the first additional receiving channel;

coordinate computing means connected to said measuring units of the main and additional channels.

19. An apparatus as claimed in any of claims 6 to 12 or 18, wherein said periodic time illumination modulation means is an optical frequency modulator for shifting the frequency of laser radiation and is positioned on the optical axis of said laser.

* * * * *